United States Patent
Le et al.

(10) Patent No.: US 6,169,058 B1
(45) Date of Patent: *Jan. 2, 2001

(54) COMPOSITIONS AND METHODS FOR HYDRAULIC FRACTURING

(75) Inventors: Hoang V. Le, Houston; Subramanian Kesavan, The Woodlands; Jeffrey C. Dawson, Spring, all of TX (US); David J. Mack; Scott G. Nelson, both of Edmond, OK (US)

(73) Assignee: BJ Services Company, Houston, TX (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/869,388

(22) Filed: Jun. 5, 1997

(51) Int. Cl.$^7$ .............................. C09K 7/02; C09K 3/00; E21B 43/26

(52) U.S. Cl. .................. 507/222; 507/224; 507/225; 507/903; 507/922; 507/924; 166/308

(58) Field of Search ...................... 507/222, 224, 507/225, 903, 922, 924; 166/308

(56) References Cited

U.S. PATENT DOCUMENTS

| | | |
|---|---|---|
| 1,421,706 | 7/1922 | Van Auken Mills . |
| 2,294,078 | 8/1942 | Dow et al. .............................. 166/33 |
| 3,172,470 | 3/1965 | Huitt et al. ............................ 166/29 |
| 3,172,471 | 3/1965 | Warren ................................... 166/33 |

(List continued on next page.)

FOREIGN PATENT DOCUMENTS

| | | |
|---|---|---|
| 197 23 661 A1 | 6/1996 | (DE) . |
| 0 280 341 A1 | 8/1988 | (EP) . |
| 0 399 767 A2 | 11/1990 | (EP) . |
| 0 896 122 A2 | 2/1999 | (EP) . |
| 0 922 414 A1 | 4/1999 | (EP) . |
| 0 933 414 A1 | 4/1999 | (EP) . |
| 2 116 227 | 9/1983 | (GB) . |
| 2 225 364 | 11/1988 | (GB) . |
| WO 98/54234 | 12/1998 | (WO) . |

OTHER PUBLICATIONS

Rhône–Poulence, *Surfactants for Energy*, p. 1–5, 1991.
BJ Technical Tips "Selective Acidizing Formulation" vol. 7, No. 1, 2 pages (Jun. 1, 1967).
Larry Harrington, "Aquachek" Stimulation Services Product Bulletin No. 750.0.WG 3 pages (Dec. 1975).
D.D. Dunlap, J.L. Boles, R.J. Novotny, "Method for Improving Hydrocarbon/Water Ratios in Producing Wells," SPE 14822, pp. 123–130 (1986).
R.J. Novotny, "Candidate Evaluation Technique for Water Control Applications," *CONEXPO '92*, (1992).
Halliburton's WOR–Con service—a simple, easy–to–use, effective, long lasting way to help reduce Water–Oil Ratios, no date Available.

(List continued on next page.)

*Primary Examiner*—Philip Tucker
(74) *Attorney, Agent, or Firm*—O'Keefe, Egan & Peterman, LLP

(57) ABSTRACT

A subterranean formation is treated by introducing a fracturing treatment composition comprising a polymer treatment fluid containing a dispersion of hydrophilic water swellable particles into the formation. The water swellable particles comprise synthetic polymers that are crosslinked so that they are water insoluble, but capable of swelling in the presence of relatively small amounts of water. When used with treatment fluids containing at least a small amount of water, the particles swell and reduce fluid loss to the formation during the treatment. When used during a hydraulic fracturing treatment of a hydrocarbon bearing formation, the particles may also reduce or eliminate water production following the fracturing treatment by restricting the extension of a fracture into water-bearing formations, and/or by restricting the flow of fluids from water-bearing areas.

58 Claims, 3 Drawing Sheets

U.S. PATENT DOCUMENTS

| | | | |
|---|---|---|---|
| 3,198,253 | 8/1965 | Holbert | 166/33 |
| 3,302,717 | 2/1967 | West et al. | 166/33 |
| 3,380,529 | 4/1968 | Hendrickson | 166/33 |
| 3,421,585 | 1/1969 | Hurst | 166/42 |
| 3,483,121 | 12/1969 | Jordan | 252/8.55 |
| 3,687,200 | 8/1972 | Routson | 166/275 |
| 3,719,228 | 3/1973 | Carcia | 166/281 |
| 3,723,408 | 3/1973 | Nordgren et al. | 260/209 R |
| 3,730,271 | 5/1973 | Gall | 166/294 |
| 3,760,881 | 9/1973 | Kiel | 166/308 |
| 3,809,160 | 5/1974 | Routson | 166/294 |
| 3,810,468 | 5/1974 | Harper et al. | 128/156 |
| 3,811,508 | 5/1974 | Friedman | 166/288 |
| 3,826,311 | 7/1974 | Szabo et al. | 166/295 |
| 3,859,107 | 1/1975 | Garcia | 106/123 |
| 3,865,189 | 2/1975 | Friedman | 166/294 |
| 3,866,684 | 2/1975 | Friedman | 166/294 |
| 3,866,685 | 2/1975 | Friedman | 166/294 |
| 3,893,510 | 7/1975 | Elphingstone et al. | 166/295 |
| 3,937,283 | 2/1976 | Blauer et al. | 166/307 |
| 3,953,338 | 4/1976 | Straus et al. | 252/8.5 C |
| 3,954,629 | 5/1976 | Scheffel et al. | 252/8.5 |
| 3,978,928 | 9/1976 | Clampitt | 166/294 |
| 3,980,136 | 9/1976 | Plummer et al. | 166/280 |
| 3,995,705 | 12/1976 | Fischer et al. | 175/69 |
| 4,021,545 | 5/1977 | Nair et al. | 424/180 |
| 4,036,764 | 7/1977 | Fischer et al. | 252/8.5 C |
| 4,061,580 | 12/1977 | Jahnke | 252/8.55 |
| 4,088,190 | 5/1978 | Fischer et al. | 166/274 |
| 4,094,795 | 6/1978 | DeMartino et al. | 252/8.55 R |
| 4,137,182 | 1/1979 | Golinkin | 252/8.55 |
| 4,137,400 | 1/1979 | DeMartino et al. | 536/114 |
| 4,148,736 | 4/1979 | Meister | 252/8.55 |
| 4,192,753 | 3/1980 | Pye et al. | 252/8.5 |
| 4,193,453 | 3/1980 | Golinkin | 166/295 |
| 4,282,928 * | 8/1981 | McDonald et al. | 166/274 |
| 4,309,523 | 1/1982 | Engelhardt et al. | 526/240 |
| 4,316,810 | 2/1982 | Burnham | 252/8.55 R |
| 4,328,864 | 5/1982 | Friedman | 166/274 |
| 4,330,450 | 5/1982 | Lipowski et al. | 524/547 |
| 4,336,145 | 6/1982 | Briscoe | 252/8.55 R |
| 4,350,601 | 9/1982 | Mosier et al. | 252/8.55 R |
| 4,357,245 | 11/1982 | Engelhardt et al. | 252/8.5 |
| 4,359,391 | 11/1982 | Salathiel et al. | 252/8.55 C |
| 4,361,186 | 11/1982 | Kalina | 166/295 |
| 4,371,443 | 2/1983 | Keeney | 252/8.55 C |
| 4,389,320 | 6/1983 | Clampitt | 252/8.55 R |
| 4,415,463 | 11/1983 | Mosier et al. | 252/8.55 R |
| 4,417,415 | 11/1983 | Cysewski et al. | 47/1.4 |
| 4,432,881 | 2/1984 | Evani | 252/8.5 |
| 4,451,631 | 5/1984 | Engelhardt et al. | 526/287 |
| 4,466,890 | 8/1984 | Briscoe | 252/8.55 R |
| 4,476,931 | 10/1984 | Boles et al. | 166/294 |
| 4,487,867 | 12/1984 | Almond et al. | 524/42 |
| 4,488,975 | 12/1984 | Almond | 252/8.55 R |
| 4,499,232 | 2/1985 | Engelhardt et al. | 524/548 |
| 4,500,437 | 2/1985 | Engelhardt et al. | 252/8.55 |
| 4,507,440 | 3/1985 | Engelhardt et al. | 525/218 |
| 4,514,309 * | 4/1985 | Wadhwa | 507/903 |
| 4,518,040 | 5/1985 | Middleton | 166/307 |
| 4,532,052 | 7/1985 | Weaver et al. | 252/8.55 |
| 4,541,935 | 9/1985 | Constien et al. | 252/8.55 |
| 4,551,513 | 11/1985 | Engelhardt et al. | 526/307.1 |
| 4,571,422 | 2/1986 | Symes et al. | 536/114 |
| 4,572,295 | 2/1986 | Walley | 166/295 |
| 4,579,175 | 4/1986 | Grodde et al. | 166/295 |
| 4,615,825 | 10/1986 | Toet et al. | |
| 4,627,495 | 12/1986 | Harris et al. | 166/280 |
| 4,635,726 | 1/1987 | Walker | 166/294 |
| 4,670,501 * | 6/1987 | Dymond et al. | 507/225 |
| 4,679,631 | 7/1987 | Dill et al. | 166/307 |
| 4,683,954 | 8/1987 | Walker et al. | 166/307 |
| 4,695,389 | 9/1987 | Kubala | 252/8.55 |
| 4,725,372 | 2/1988 | Toet et al. | 252/8.514 |
| 4,735,731 | 4/1988 | Rose et al. | 252/8.51 |
| 4,753,659 | 6/1988 | Bayerlein et al. | 8/561 |
| 4,779,680 | 10/1988 | Sydansk | 166/300 |
| 4,798,888 | 1/1989 | Symes et al. | 536/123 |
| 4,828,911 | 5/1989 | Morman | 428/288 |
| 4,892,916 * | 1/1990 | Hawe et al. | 507/903 |
| 4,913,824 | 4/1990 | Kneller | 210/701 |
| 4,921,621 | 5/1990 | Costello et al. | 252/8.513 |
| 4,952,550 | 8/1990 | Wallach et al. | 502/404 |
| 4,975,482 | 12/1990 | Peiffer | 524/535 |
| 5,010,954 | 4/1991 | Falk | 166/295 |
| 5,016,714 | 5/1991 | McCabe et al. | 166/308 |
| 5,028,271 | 7/1991 | Huddleston et al. | 106/720 |
| 5,036,136 | 7/1991 | Peiffer | 524/812 |
| 5,048,607 | 9/1991 | Phelps et al. | 166/270 |
| 5,073,202 | 12/1991 | Wallach | 134/6 |
| 5,086,840 | 2/1992 | Soucemarianadin et al. | 166/294 |
| 5,093,448 | 3/1992 | Peiffer | 526/310 |
| 5,103,910 | 4/1992 | Chan | 166/294 |
| 5,111,886 | 5/1992 | Dovan et al. | 166/300 |
| 5,125,456 | 6/1992 | Hutchins et al. | 166/295 |
| 5,128,462 | 7/1992 | Zody | 536/114 |
| 5,145,012 | 9/1992 | Hutchins et al. | 166/292 |
| 5,161,615 | 11/1992 | Hutchins et al. | 166/295 |
| 5,203,834 | 4/1993 | Hutchins et al. | 166/270 |
| 5,207,934 | 5/1993 | Dovan et al. | 252/8.551 |
| 5,211,239 | 5/1993 | Thomas et al. | 166/308 |
| 5,211,858 | 5/1993 | Dovan et al. | 252/8.551 |
| 5,213,446 | 5/1993 | Dovan | 405/128 |
| 5,225,090 | 7/1993 | Hutchins et al. | 252/8.551 |
| 5,226,480 | 7/1993 | Dovan et al. | 166/300 |
| 5,233,032 | 8/1993 | Zody et al. | 536/114 |
| 5,244,042 | 9/1993 | Dovan et al. | 166/270 |
| 5,246,073 | 9/1993 | Sandiford et al. | 166/295 |
| 5,247,995 | 9/1993 | Tjon-Joe-Pin et al. | 166/312 |
| 5,263,540 | 11/1993 | Dovan et al. | 166/278 |
| 5,268,112 | 12/1993 | Hutchins et al. | 252/8.551 |
| 5,278,206 | 1/1994 | Göbel et al. | 524/13 |
| 5,291,949 | 3/1994 | Dovan et al. | 166/295 |
| 5,310,002 | 5/1994 | Blauch et al. | 166/307 |
| 5,310,774 * | 5/1994 | Farrar | 507/224 |
| 5,335,733 | 8/1994 | Sandiford et al. | 166/300 |
| 5,360,558 | 11/1994 | Pakulski et al. | 252/8.551 |
| 5,379,841 | 1/1995 | Pusch et al. | 166/295 |
| 5,382,371 | 1/1995 | Stahl et al. | 507/221 |
| 5,386,874 | 2/1995 | Laramay et al. | 166/300 |
| 5,416,158 | 5/1995 | Santhanam et al. | 524/760 |
| 5,417,287 | 5/1995 | Smith et al. | 166/308 |
| 5,418,217 | 5/1995 | Hutchins et al. | 507/222 |
| 5,421,412 | 6/1995 | Kelly et al. | 166/300 |
| 5,465,792 | 11/1995 | Dawson et al. | 166/295 |
| 5,486,312 | 1/1996 | Sandiford et al. | 252/315.1 |
| 5,510,436 | 4/1996 | Hille et al. | 526/240 |
| 5,529,122 | 6/1996 | Thach | 166/281 |
| 5,559,082 | 9/1996 | Sanner et al. | 507/273 |
| 5,575,335 | 11/1996 | King | 166/280 |
| 5,617,920 | 4/1997 | Dovan et al. | 166/295 |
| 5,701,956 | 12/1997 | Hardy et al. | 166/295 |
| 5,735,349 * | 4/1998 | Dawson et al. | 507/225 |
| 5,944,106 | 8/1999 | Dalrymple et al. | 166/281 |
| 5,964,295 | 10/1999 | Brown et al. | 166/308 |
| 5,979,557 | 11/1999 | Card et al. | 166/300 |

OTHER PUBLICATIONS

Jimmie D. Weaver, "A New Water–Oil Ratio Improvement Material," SPE 7574 (1978).

Burnham and Harris "Developments in Hydrocarbon Fluids for High–Temperature Fracturing," *J. Petroleum Technology*, pp. 217–220, Feb. 1980.

"Emulsion Polymers and Emulsion Polymerization," American Chemical Society (ACS) Symposium Series 165 (1981).

John L. Gidley, PhD, et al. "Recent Advances in Hydraulic Fracturing," Henry L. Doherty Memorial Fund of AIME, Society of Petroleum Engineers, 17 pages (1989).

Ash and Ash, "Handbook of Industrial Surfactants: An International Guide to More Than 16,000 Products by Tradename, Application, Composition & Manufacturer, " Gower Publishing Company, pp. 44, 47, 83–84, 185, 191, 192, 195, 196–197, 278, 285, 312, 313, 347–348, 361, 374–375, 399, 418, 460, 485–486, 499–500, 503, 510, 556, 592 (1993).

Holm, "The mechanism of gas and liquid flow through porous media in the presence of foam," *Soc. Petroleum Eng. AIME*, # SPE 1848, 1967.

Beyer et al., "Flow behavior of foam as a well circulating fluid," *Soc. Petroleum Eng. AIME*, # SPE 3986, 1972.

Millhone et al., "Factors affecting foam circulation in oil wells," *Soc. Petroleum Eng. AIME*, # SPE 4001, 1972.

Blauer and Kohlhaas, "Formation fracturing with foam," *Soc. Petroleum Eng. AIME*, # SPE 5003, 1974.

Holm, "Status of $CO_2$ and hydrocarbon miscible oil recovery methods," *Soc. Petroleum Eng. AIME*, # SPE 5560, 1975.

Essary and Rogers, "Techniques and results of foam redrilling operations–San Joaquin Valley, California," *Soc. Petroleum Eng. AIME*, # SPE 5715, 1976.

Kanda and Schechter, "On the mechanism of foam formation in porous media," *Soc. Petroleum Eng. AIME*, # SPE 6200, 1976.

Aizad and Okandan, "Flow equation for foam flowing through porous media and its application as a secondary recovery fluid," *Soc. Petroleum Eng. AIME*, # SPE 6599, 1976.

King, "Factors affecting dynamic fluid leakoff with foam fracturing fluids," *Soc. Petroleum Eng. AIME*, # SPE 6817, 1977.

Rohret, "Stimulation of the niabrara formation using foamed methanol–water," *Soc. Petroleum Eng. AIME*, # SPE 7174, 1978.

Komar and Yost, "Practical aspects of foam fracturing in the devonian shale," *Soc. Petroleum Eng. AIME*, # SPE 8345, 1979.

Leach and Yellig, "Compositional model studies: $CO_2$–oil displacement mechanisms," *Soc. Petroleum Eng. AIME*, # SPE 8368, 1979.

Bernard et al., "Use of Surfactant to reduce $CO_2$ mobility in oil displacement," *Soc. Petroleum Eng. AIME*, # SPE 8370, 1979.

Driscoll et al., "Oil base foam fracturing applied to the niobrara shale formation," *Soc. Petroleum Eng. AIME*, # SPE 9335, 1980.

Holcomb et al., "Chemistry, physical nature, and rheology of aqueous stimulation foams," *Soc. Petroleum Eng. AIME*, # SPE 9530, 1981.

Wendorff and Ainley, "Massive hydraulic fracturing of high–temperature wells with stable frac foams," *Soc. Petroleum Eng. AIME*, # SPE 10257, 1981.

Reidenbach et al., "Rheological study of foam fracturing fluids using nitrogen and carbon dioxide," *Soc. Petroleum Eng. AIME*, # SPE 12026, 1983.

Watkins et al., "A new crosslinked foamed fracturing fluid," *Soc. Petroleum Eng. AIME*, # SPE 12027, 1983.

Maini and Ma, "Relationship between foam stability measured in static tests and flow behavior of foams in porous media," *Soc. Petroleum Eng. AIME*, # SPE 13073, 1984.

Harris and Reidenbach, "High–temperature rheological study of foam fracturing fluids," *Soc. Petroleum Eng. AIME*, # SPE 13177, 1984.

Cameron et al., "New insights on the rheological behavior of delayed crosslinked fracturing fluids," *Soc. Petroleum Eng. AIME*, # SPE 18209, 1988.

Brannon and Pulsinelli, "Breaker concentrations required to improve the permeability of proppant–packs damaged by concentrated linear and borate–crosslinked fracturing fluids," *Soc. Petroleum Eng. AIME*, # SPE 90–90 (Preprint), 1990.

Bullen, "Combination foam/fluid fracturing," *J. Canadian Petroleum Technology*, pp. 51–56, 1980.

Smith and Holcomb, "Foamed hydrocarbons: an effective and economical alternative to conventional stimulation methods," *Southwestern Petroleum Short Course*, pp 65–72, no date available.

Holcomb and Wilson, "Foamed acidizing and selective diverting using stable foam for improved acid stimulation," *Southwestern Petroleum Short Course*, pp 67–74, no date available.

Metzner et al., "A method for the measurement of normal stresses in simple shearing flow," *Transactions Soc. Rheology*, pp 133–147 (1961).

Hanks and Bonner, "Transitional flow phenomena in concentric annuli," *Ind. Eng. Chem. Fundam.*, 10(1):105–112, 1971.

Lord et al., "General turbulent pipe flow scale–up correlation for rheologically complex fluids," *Soc. Petroleum Eng. J.*, pp. 252–258, Sep. 1967.

Hanks and Dadia, "Theoretical analysis of the turbulent flow of non–newtonian slurries in pipes," *AIChE J.*, 17(3):554–557, May 1971.

Blauer and Holcomb, "Foam fracturing shows success in gas, oil formations," *Oil and Gas Journal*, pp. 57–60, Aug. 4, 1975.

Eakin and Eckard, *Petroleum Engineer*, pp. 71–84, Jul. 1966.

"1: What foam is and how it's used," *World Oil*, pp. 75–77, Nov. 1969.

"2: Stable foam speeds well cleanout," *World Oil*, pp. 78–83, Nov. 1969.

Krug, "Foam pressure loss in vertical tubing," *Oil and Gas Journal*, pp. 74–76, Oct. 6, 1975.

Bentsen and Veny, "Preformed stable foam performance in drilling and evaluating shallow gas wells in Alberta," *J. Petroleum Tech.*, pp. 1237–1240, Oct. 1976.

Hanks and Larsen, "The flow of power–law non–newtonian fluids in concentric annuli," *Ind. Eng. Chem. Fundam.*, 18(1):33–35, 1979.

Holcomb, "Foam: for fracturing and acid stimulation," *Drilling*, p. 46, Jan. 1982.

Holcomb, "Foam: for fracturing and acid stimulation," *Drilling*, p. 130, Feb. 1982.

Holcomb, "Foam: for fracturing and acid stimulation," *Drilling,* p. 199, May 1982.

"Sand Concentrator for Foam Fracturing" Canadian Fracmaster, Ltd., two pages., no date available.

"Surfactants for Oilfield," Witco Oleo/Surfactants Group, 33 pages., no date available.

Neill et al., "Field and Laboratory Results of Carbon Dioxide and Nitrogen in Well Stimulation," *J. Petroleum Technology,* pp. 244–248, Mar. 1964.

Burnham, Harris, McDaniel, "Developments in Hydrocarbon Fluids for High Temperature Fracturing," Society of Petroleum Engineers of AIME, SPE 7546, pp. 1–7 (includes 4 pages of figures/drawings/tables), 1978.

Bilden, Kesavan, Dawson, "A New Polymer Approach Applicable for the Control of Water Production," Petroleum Network Education Conferences, pp. 1–10 (includes 4 pages of Figures), 1996.

* cited by examiner

COMPOSITIONS AND METHODS FOR HYDRAULIC FRACTURING

BACKGROUND OF THE INVENTION

1. Field of the Invention

This invention relates generally to subterranean formation treatments and, more specifically, to hydraulic fracturing treatments for subterranean formations. In particular, this invention relates to the addition of hydrophillic swelling polymers to hydrocarbon-based fracture treatment fluids to control fluid loss during a hydraulic fracture treatment. This invention also relates to the addition of swelling polymers to hydrocarbon-based fracture treatment fluids to prevent or inhibit fracture growth into adjacent water-bearing formations and prevent or inhibit water production from these formations following a hydraulic fracture treatment.

2. Description of Related Art

Hydraulic fracturing of oil or gas wells is a technique routinely used to improve or stimulate the recovery of hydrocarbons. Hydraulic fracturing is typically employed to stimulate wells which produce from low permeability formations. In such wells, recovery efficiency is typically limited by the flow mechanisms associated with a low permeability formation. Hydraulic fracturing is usually accomplished by introducing a proppant-laden treatment fluid into a producing interval at high pressures. This fluid induces a fracture in the reservoir and transports proppant into the fracture, before "leaking off" into the surrounding formation. After the treatment, proppant remains in the fracture in the form of a permeable "pack" that serves to "prop" the fracture open. In this way, the proppant pack forms a highly conductive pathway for hydrocarbons and/or other formation fluids to flow into the wellbore.

Typically, viscous gels or foams are employed as fracturing fluids in order to provide a medium that will adequately suspend and transport solid proppant materials, as well as to impair loss of fracture fluid to the formation during treatment (commonly referred to as "filterability" or "fluid loss"). As such, viscosity of a fracture fluid may affect fracture geometry because fluid loss affects the efficiency of a treatment. For example, when the rate of fluid loss to the formation equals or exceeds the rate of injection or introduction of fluid into a fracture, the fracture stops growing. Conversely, when the rate of fluid loss is less than the injection or introduction rate, taken together with other factors, a fracture continues to propagate. Excessive fluid loss thus results in fractures that are smaller and shorter than desired.

Viscosity of commercially available hydrocarbon-based gels typically results from a mixture of alkylphosphate esters and aluminum or ferric ions in an acidic environment. When the acidity of such a mixture is adjusted to the optimum level, the surfactants tend to organize themselves from sphere-like micelles to rod-like micelles. Micelle size is typically dependent on concentrations of alkylphosphate ester and metallic ions together with the relative ratios of mono-, di- and tri-phosphate esters. Viscosities in excess of about 400 cps at 170 sec$^{-1}$, as measured by a Fann 50C viscometer, are routinely measured for these fluids. As a rule, viscosities in excess of about 100 cps are regarded as satisfactory for fracturing. Such mixtures of esters and metal salts form micelles with associations that are relatively weak and lack sufficient filter cake building ability to effectively control fluid loss. Further information may be found in "Developments in Hydrocarbon Fluids for High Temperature Fracturing," by Burnham et al., *SPE* 7564.

In order to limit fluid loss and improve fracture efficiency, viscosifying agents are often added to fracturing fluids. In the case of water-based fracturing fluids, polymers such as guar, derivatized guar or derivatized celluloses are typically employed to viscosity the fluid. These polymers are typically added to water or dilute saline solutions at concentrations ranging from about 10 lbs. to about 60 lbs. per 1000 gallons of treating fluid (or from about 0.24% to about 0.72% (wt/vol)) to hydrate the polymers. These polymers may also be crosslinked or foamed to achieve three dimensional gels and further increases in viscosity. Under filtering conditions like those occurring during fluid loss to a subterranean formation, crosslinked polymers tend to filter out, leaving a layer of collapsed polymer chains on the filtering media that is referred to as the filter cake. As filtering continues, the cake tends to grow and impair solvent loss through the filter cake membrane. Therefore, during a hydraulic fracturing treatment, hydrophillic polymers tend to form filter cake walls on a formation face, thereby inhibiting fluid loss to the formation.

However, for hydrocarbon-based fracture gels, these types of hydrophillic polymers are typically not effective viscosifiers due to insufficient water content in the fracture fluid. Therefore, hydrocarbon-based gels are typically viscosified by associating surfactants. Forces binding the associating surfactants together are typically ionic in nature. Although these forces can be strong in the absence of solvents, polar solvents present in micelles allow the surfactants to continually associate and disassociate. When mechanical forces (such as filtration) are applied, these surfactants tend to readily disassociate to relieve those forces acting on the micelle structure. In the case of well treatments, this phenomenon hampers fluid loss control by inhibiting filter cake formation. Small counter ions, such as hydronium, sodium, chloride, sulfate and acetate ions tend to maintain charge balance of these disassociated surfactants. Because surfactants lack the filter cake building properties of hydrophillic polymers, fluid loss is difficult to control during fracture treatments using hydrocarbon-based fluids.

In an attempt to control fluid loss during hydrocarbon-based fracture treatments, starch or similar carbohydrate polymers have been added to hydrocarbon-based gels. Typically, these polysaccharide-based fluid loss additives are added as dry powders or hydrocarbon-based suspensions. However, due to the small amount of water (if any) usually present in such gels, these materials typically fail to provide the degree of fluid loss control obtainable with water-based fracturing fluids especially at higher temperatures. A further disadvantage with such natural polymer fluid loss control agents is that relatively large volumes (typically from about 10 to about 50 lbs. per thousand gallons of treatment fluid) of these materials are usually required to achieve even marginal fluid loss control. These polymer additives, when in an unhydrated state, do not readily deform under mechanical shear. Consequently, as a fluid loss additive, they tend to bridge together at flow channels in the rock. Due to this lack of deformation, the concentration of additive may exceed 40 lbs. per thousand gallons of treatment fluid before suitable fluid loss control is observed depending on permeability of the formation. Such large volumes may be damaging to a fracture proppant pack and/or formation. Moreover, the pH of any water phase present in a hydrocarbon-based fracture treatment is typically acidic (typically between about 2 and about 3) due to addition of viscosifying agents. This acidic environment tends to accelerate breakdown of natural polymers such as carbohydrates, thereby further reducing their effectiveness as fluid loss control agents.

Other fluid loss control methods utilize solid materials, such as 100 mesh sand or 200 mesh sand (commonly referred to as silica flour) and clay to control fluid loss during hydrocarbon-based fracture treatments. However, the use of solid plugging materials is undesirable because of their low efficiency as fluid loss additives and because they tend to cause unremovable damage to the proppant pack. Silica flour is often added to fracturing fluids in amounts from about 25 lbs. to about 100 lbs. per 1,000 gallons of treating fluid. The silica flour is often produced back through the propped fracture, which in turn can cause damage to the operation of downhole and surface equipment.

Another problem encountered during hydraulic fracturing treatments of hydrocarbon-bearing (or hydrocarbon productive) formations is the propagation of a fracture into water-bearing (or water productive) areas of a formation or into nearby water-bearing formations. When this occurs, overall hydrocarbon productivity of a well may be reduced or destroyed by production of large amounts of water from the water-bearing formation. To avoid this problem, fluid and proppant volumes, pumping rates, and/or pumping pressures are often curtailed when a nearby formation is suspected of being water-bearing. In some cases, a hydraulic fracturing treatment may not be performed due to the danger of creating fracture communication with a water-bearing formation. In other cases, a hydraulic fracturing treatment may establish communication with a previously unknown water-bearing formation.

SUMMARY OF THE INVENTION

In one aspect, this invention is a method of treating a subterranean formation, including the step of introducing a polymer treatment fluid comprising a dispersion of water swellable particles into at least a portion of the formation at a pressure above the fracturing pressure of the formation. The particles include synthetic polymers that are crosslinked so that the polymers are insoluble in water. The polymer treatment fluid may be introduced into the formation as part of a proppant-laden treatment fluid including a mixture of a fracture proppant material and the polymer treatment fluid, or may be introduced into the formation preceding or following a proppant-laden treatment fluid including a fracture proppant material. The polymers may be formed by polymerizing monomers in an oil external emulsion and/or may be internally crosslinked. In various embodiments, the polymers may include at least one nonionic monomer, ionic and nonionic monomers, anionic and nonionic monomers, cationic and nonionic monomers, or cationic, anionic, and nonionic monomers. The fracture proppant material may be at least one of sand, resin-coated sand, ceramic particles, synthetic organic particles, glass microspheres, sintered bauxite, resin-coated ceramic particles, resin-coated sintered bauxite, or a mixture thereof. In one embodiment, the dispersion of water swellable polymer particles may be introduced into the formation as part of a fracturing treatment fluid in which the dispersion of polymer particles is present in the fracturing treatment fluid in a concentration of between about 0.1% and about 1.5% by volume of the fracturing treatment fluid. In another embodiment, the polymer treatment fluid may be introduced into a formation, which is a hydrocarbon-bearing formation having water-bearing areas or is a hydrocarbon-bearing formation located adjacent to a water bearing formation, in such a way that a fracture is induced in the hydrocarbon-bearing formation during the treatment. The polymer particles interact with the water-bearing areas of the hydrocarbon-bearing formation or with the adjacent water bearing formation so as to limit growth of the fracture into the water-bearing areas of the hydrocarbon-bearing formation or the adjacent water-bearing formation. In still another embodiment, the polymer treatment fluid may be introduced into a formation, which is a hydrocarbon-bearing formation having water-bearing areas or is a hydrocarbon-bearing formation located adjacent to a water bearing formation, in such a way that a fracture is induced in the hydrocarbon-bearing formation during the treatment. In this embodiment, the polymer particles interact with the water-bearing areas of the hydrocarbon-bearing formation or with the adjacent water bearing formation so as to restrict the flow of fluids from the water-bearing areas of the hydrocarbon-bearing formation or the adjacent water-bearing formation following the treatment.

In another aspect, this invention is a method of treating a subterranean formation, including the step of forming a dispersion of water swellable particles including synthetic polymers that are crosslinked so that the polymers are insoluble in water. In this method, an inverting surfactant is combined with the dispersion of water swellable crosslinked polymer particles, and the dispersion of water swellable crosslinked polymer particles are combined with a carrier fluid to form a polymer treatment fluid. The polymer treatment fluid is then introduced into the formation at a pressure above the fracturing pressure of the formation. The water swellable crosslinked polymer particles may be formed by invert polymer emulsion. In one embodiment, the polymer particles may be present in the polymer treatment fluid in a concentration of between about 0.1% and about 1.5% by volume. In another embodiment, the water swellable crosslinked polymer particles have a size ranging from about 0.5 μm to about 5 μm. In another embodiment, the polymer treatment fluid may include the polymer particles dispersed in a hydrocarbon fluid containing from about 0.1% to about 0.5% water based on total volume of the polymer treatment fluid. In this method a variety of polymer embodiments are possible. For example, in a first polymer embodiment the polymers may include at least one nonionic vinylamide monomer of the formula:

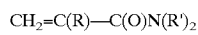
$$CH_2=C(R)-C(O)N(R')_2$$

where R represents a hydrogen, methyl, ethyl or propyl moiety and R' represents hydrogen, methyl, ethyl or propyl moiety. In a second polymer embodiment the polymers may further include at least one monomer containing ammonium or quaternary ammonium moieties, and a crosslinking monomer. In this second embodiment, the polymers may also further include a monomer having the formula:

$$CH_2=CHC(O)X,$$

where X represents a moiety containing a carboxylic acid or salt of that acid or a moiety containing a sulfuric acid or salt of that acid. In this regard, the water swellable crosslinked polymer particles may include about 0 parts to about 5 parts of the monomer having the formula:

$$CH_2=CHC(O)X,$$

where X represents a moiety containing a carboxylic acid or salt of that acid or a moiety containing a sulfuric acid or salt of that acid. In this second embodiment, the dispersion of water swellable crosslinked polymer particles may include from about 0 parts to about 5 parts of the vinylamide monomer. In this second embodiment, the dispersion of water swellable crosslinked polymer particles may also include from about 0.5 parts to about 5 parts of the monomer containing ammonium or quarternary ammonium moieties. In this second embodiment, the dispersion of water swellable crosslinked polymer particles may also include from about 50 ppm to about 1000 ppm of the crosslinking monomer based on total monomer present in the dispersion. In another embodiment, the polymers may include ionic and nonionic monomers, the nonionic monomers including at least one of acrylamide, vinyl pyrolidone, n-vinylacetamide, or mixtures thereof. In another embodiment, the polymers may include anionic and nonionic monomers, the monomers including acrylamide, acrylic acid and further including a methylenebisacrylamide crosslinker. In another embodiment, the polymers may include cationic and non-ionic monomers, the monomers including acrylamide, methylene bisacrylamide, and at least one of dimethyldiallylammonium chloride or methacrylamidoethyltrimethylammonium, or a mixture thereof. In another embodiment, the polymers may include ionic and noionic monomers, the ionic monomers including at least one of acrylic acid, acrylamidomethylpropane-sulfonic acid, maleic acid, itaconic acid, styrene sulfonic acid, vinylphosphonic acid, dimethyldiallylammonium chloride, quaternary ammonium salt derivatives of acrylamide, quaternary ammonium salt derivatives of acrylic acid, or mixtures thereof. In another embodiment, the polymers may include cationic and nonionic monomers, the cationic monomer including at least one monomer containing ammonium or quaternary ammonium moieties. In another embodiment, the polymers may include anionic and nonionic monomers, the anionic monomers including at least one monomer having the formula:

CH$_2$=CHC(O)X, where X represents a moiety containing a carboxylic acid or salt of that acid or a moiety containing a sulfuric acid or salt of that acid. In another embodiment, the polymers may include cationic, anionic, and nonionic monomers, wherein the nonionic monomer comprises at least one monomer of the formula:

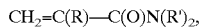

CH$_2$=C(R)—C(O)N(R')$_2$, where R represents hydrogen, methyl, ethyl, or propyl moiety and R' represents hydrogen, methyl, ethyl or propyl moiety, the cationic monomer comprises at least one monomer containing ammonium or quaternary ammonium moieties, and the anionic monomer comprises at least one monomer having the formula:

CH$_2$=CHC(O)X, where X represents a moiety containing a carboxylic acid or salt of that acid or a moiety containing a sulfuric acid or salt of that acid.

In another aspect, this invention is a method for hydraulically fracturing a hydrocarbon-bearing subterranean formation and for controlling production of aqueous fluids from a well penetrating the hydrocarbon-bearing subterranean formation following the hydraulic fracturing treatment. In this method, the hydrocarbon-bearing formation may have water-bearing areas or may be positioned nearby a water-bearing formation. The method includes the step of introducing a polymer treatment fluid through the well into at least a portion of the hydrocarbon-bearing formation and so that a fracture is induced in the hydrocarbon-bearing formation during the treatment. The polymer treatment fluid may include a dispersion of water swellable particles that include synthetic polymers that are crosslinked so that the polymers are insoluble in water. In this method, the polymer treatment fluid may be introduced into the formation as at least one of a proppant-laden polymer treatment fluid including a mixture of a fracture proppant material and the polymer treatment fluid, or as a treatment fluid including the polymer treatment fluid introduced into the hydrocarbon-bearing formation before or after a proppant-laden treatment fluid including a fracture proppant material. In this method, the polymer particles interact with the water-bearing areas of the hydrocarbon-bearing formation or with the nearby water-bearing formation so as to limit production of aqueous fluids from the well following the treatment. In one embodiment, the polymers may be formed by polymerizing monomers in an oil external emulsion. In another embodiment, the polymer particles may be present in the treatment fluid in a concentration of between about 0.1% and about 10% by volume. In one embodiment of this method, the polymer particles interact with the water-bearing areas of the hydrocarbon-bearing formation or with the adjacent water bearing formation so as to limit growth of the fracture into the water-bearing areas of the hydrocarbon-bearing formation or the adjacent water-bearing formation. In another embodiment of this method, the polymer particles interact with the water-bearing areas of the hydrocarbon-bearing formation or with the adjacent water bearing formation so as to restrict the flow of fluids from the water-bearing areas of the hydrocarbon-bearing formation or the adjacent water-bearing formation following the treatment.

DESCRIPTION OF ILLUSTRATIVE EMBODIMENTS

Figure 1:
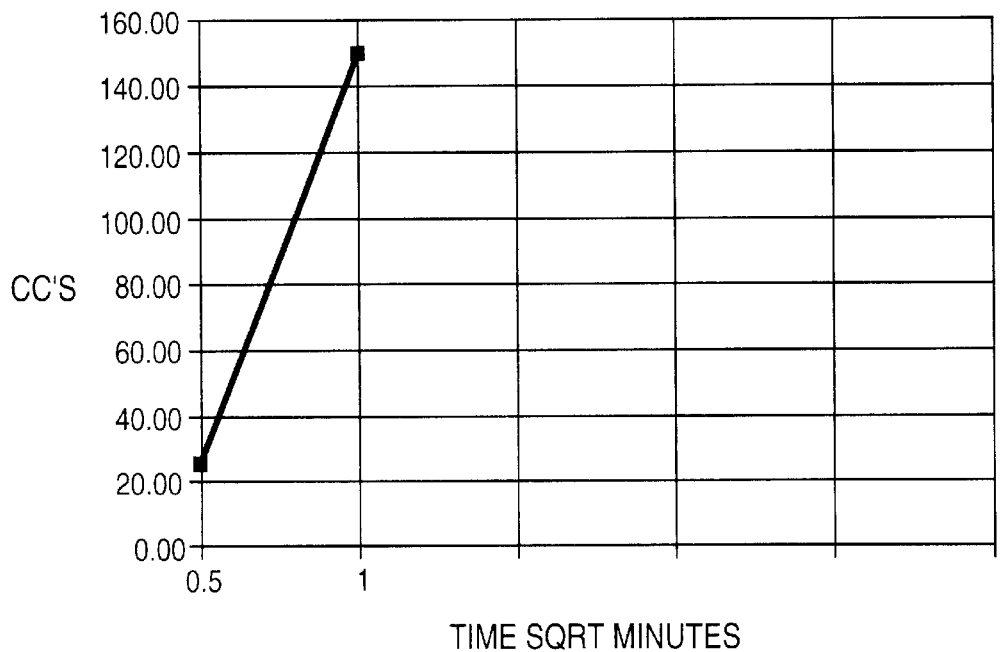
FIG. 1 shows fluid loss as a function of time for an oil gel without fluid control additive.

In embodiments of the disclosed method, fluid loss control during hydrocarbon-based fracture treatments may be improved by the use of hydrophillic, swelling polymers (sometimes referred to as "superabsorbing particles") and as a result, the efficiency of hydrocarbon-based fracture treatments are surprisingly improved. As used herein, "hydrocarbon-based" refers to a treatment fluid or carrier fluid that is predominantly non-aqueous in nature and which predominantly comprises a hydrocarbon fluid or mixture of hydrocarbon fluids. Treatment fluids that are hydrocarbon-based may be, among other things, linear, crosslinked, gelled, or foamed.

These swelling polymers or superabsorbing particles are based on synthetic polymers that are unable to hydrate, but when interacting with water, may swell up to many times their original size. As used herein, "synthetic polymer" means a polymer prepared by vinyl or condensation polymerization. Typically, these polymers are prepared by incorporating small amounts of divinyl monomers that when polymerized, act as crosslinked joints in the polymer structure. Because of this crosslinking, the polymer particles are inhibited from hydrating and/or solvating like conventional carbohydrate polymers used for fluid loss control. Instead, these particles react to water by swelling many times their original size. Advantageously then, these particles are capable of considerable swelling in the presence of relatively small amounts of water, unlike conventional starch-based polymers typically employed with hydrocarbon-based gels for fluid loss control. Therefore, these superabsorbing particles offer much improved fluid loss control properties for hydrocarbon-based fracture treatments. Furthermore, the superabsorbing particles of the disclosed method are not substantially affected by acidic or alkaline conditions, salt content or high temperatures which are frequently found within subterranean wells.

As these particles take on an aqueous solvent and swell, they become microgels dispersed in the solvent, and in some embodiments, these microgels tend to exhibit plastic-like behavior and may be easily deformed. Placing these polymers in a hydrocarbon-based treatment fluid followed by combination with small amounts of water (usually added directly or as part of the activator) causes the particles to swell. While not wishing to be bound by theory, it is believed that during a hydraulic fracture treatment, these particles screen out to form an aqueous, hydrophilic barrier or skin on the fracture formation face. In doing so, it is believed that the particles, which are amphoteric, adsorb onto formation material thereby forming a film having a thickness approximately equal to the particle diameter in some embodiments. It is believed that this film or barrier is deformable and tends to seal the pore channels on the surface of the fracture face, preventing further solvent or fluid from flowing from the fracture into the formation matrix. This mechanism and the particles of the disclosed method are useful for preventing fluid loss in water or hydrocarbon-based fracture fluids. However, because the above described hydrophillic barrier tends to be water wet, it is believed that fluid loss control of hydrocarbon-based fracture fluids is particularly enhanced.

Furthermore, when a hydrocarbon-based fracture fluid containing hydrophillic swelling particles encounters a water-bearing formation, additional particle swelling occurs within the formation. While not wishing to be bound by theory, it is believed that this additional swelling tends to create an increase in the in situ stress in the water-bearing zone, thus diverting the fracture propagation to a lower stressed zone and preventing further penetration into the water-bearing zone. Advantageously, by limiting the growth of a fracture into a water-bearing formation, this embodiment of the disclosed method offers improved hydrocarbon productivity and helps reduce water production from water-bearing zones. Therefore, when fracturing hydrocarbon-bearing formations that are in near proximity to water-bearing formations, the disclosed method may make it possible to perform larger hydraulic fracture treatments at higher fluid rates and pressures without increased risk of excess water production. The disclosed method may also make possible fracture treatment of some hydrocarbon-bearing formations that are located too close to water-bearing formations for conventional fracture treating methods.

Superabsorbing Particles

Previously, superabsorbing materials have been used in many applications for absorbing excess water. These particles are commercially used in such products as diapers and feminine hygiene products to rapidly absorb aqueous fluids. The superabsorbing particles typically absorb from about 10 to about 1,000 times their weight of water and are typically stable at temperatures up to 300° F. While these particles are suitable for many applications, such as those described above, one embodiment of the disclosed method involves the use of such particles in minimizing the amount of fluid lost from a propagating fracture to the formation during a hydraulic fracturing treatment. In another embodiment, the disclosed method involves the use of such particles during a hydraulic fracturing treatment at concentrations sufficient so that they interact with formation water as they are leaked off to a formation so as to plug and minimize production of formation water after a well is returned to production. In still another embodiment, the disclosed method involves the use of such particles during a hydraulic fracturing treatment to interact with formation water in such a way to create a stress barrier to prevent the further migration of a hydraulic fracture into water-bearing zones.

As discussed herein, the term "superabsorber" refers to those materials or particles which are formed from hydratable polymers that are crosslinked to prevent their solubilization in aqueous fluids while allowing the particles to absorb water. These superabsorbing particles or materials are typically polymerized using precipitation polymerization techniques. In precipitation polymerization, the polymers grow in size until they begin to precipitate out of solution. This may result in a very large particle size of between about 5 and about 300 $\mu$m in diameter. These superabsorbing particles are commercially available, such as those manufactured under the name "SANWET" by HOECHST CASELLA in Frankfurt, Germany.

Some embodiments of the disclosed method may employ commercially available superabsorbing particles. Most commercially available superabsorber polymer particles range in size from about 100 $\mu$m to about 300 $\mu$m in diameter, although other sizes may be commercially available, for example a size of about 10 $\mu$m, with additional pulverization. These commercially available "super absorbers" are typically made by precipitation processes. In these processes, monomers are added to a solvent such as t-butanol. As the polymerization proceeds, the polymer molecular weight increases and the solvent's ability to maintain solubility diminishes until the polymer finally precipitates from solution.

While it may be possible that relatively large superabsorber particles (such as those having a diameter of greater than about 5 $\mu$m) may be useful in treating highly permeable formations containing fractures and large pore channels, they may present problems when treating formations of lower permeability, such as those formations that are typically treated by hydraulic fracturing. In order to form smaller particles, i.e., particles having a particle size of less than or equal to about 5 $\mu$m, superabsorbing particles have been prepared using invert emulsion polymerization techniques which are described in more detail in the discussion which follows. Using an invert emulsion process, polymer particles that are superabsorber-like, but that are smaller than commercially available particles may be made, typically ranging in size between about 0.05 $\mu$m and about 1 $\mu$m. Most typically, these particles have an initial size of between about 0.1 and about 0.5 microns, and may exhibit a volume increase of about 20% when fully satisfied with water.

Ionic and Non-Ionic Compositions

In preparing superabsorbing particles, various hydrophillic monomers may be used in polymerization. In this disclosure, the term "monomer" refers to those molecules or compounds capable of conversion to polymers by combining with other like or similar molecules or compounds. Hydrophillic monomers may include both ionic and nonionic monomers. In this disclosure, the term "nonionic monomer" refers to monomers that do not ionize in an aqueous solution at a pH ranging from about 3.0 to about 10.0. Examples of suitable nonionic monomers for use in superabsorbers include, but are not limited to, acrylamide, vinyl pyrrolidone and n-vinylacetamide. In one embodiment, monomers from the acrylamide family are typically employed.

Examples of suitable anionic monomers include, but are not limited to, the alkali salts of acrylic acid, acrylamidomethylpropanesulfonic acid (AMPS), maleic acid, itaconic acid, styrene sulfonic acid, vinylphosphonic acid, and sulfonate monomers, i.e. those monomers containing —$SO_3$— pendant or functional groups. Suitable cationic monomers include, but are not limited to, dimethyldiallylammonium chloride, dimethyldiallyl ammonium chloride and methacrylamidoethyltrimethylammonium chloride, and quaternary ammonium salt derivatives from acrylamide, methacrylamide, methacrylic acid or acrylic acid such as acrylamidoethyltrimethylammonium chloride.

These hydrophillic monomers may be polymerized and crosslinked with or without an internal crosslinking agent. An internal crosslinking agent is typically a monomer having at least two reactive sites. Divinyl monomers are preferred for use as the internal crosslinking agents. These "crosslinking" monomers may also be hydrophillic and may be ionic or nonionic. During polymerization of the hydrophillic monomers, the two double bonds of these internal crosslinking monomers allow two polymer chains to grow out of the divinyl monomer. This results in the polymer chains being crosslinked at the location of the divinyl monomer forming a three-dimensional network. Examples of suitable divinyl compounds for use as internal crosslinking agents include, but are not limited to, divinyl benzene, methylene bisacrylamide, methylene bismethacrylamide, bisphenol A diacrylate, 1,4-butylene glycol diacrylate, diallylamine, N,N-diallylacrylamide, diallyldimethylammonium chloride, diallyl esters such as diallyl adipate, 1,4-divinyloxybutane, divinyloxyethane, divinyldimethylsilane, divinyl sulfone, divinyl tetramethyl disiloxane and N-methylol acrylamide. Also, adducts resulting from the addition of aldehydes such as formalin or glyoxal to vinyl amides form crosslink junctions during the polymerization. The amount of internal crosslinking is controlled by the amount of divinyl compound used. In addition to divinyl compounds, other suitable crosslinking agents include, but are not limited to, di- or polyisocynates and di- or polysilanes. Other examples of non-ionic, cationic and anionic monomers, as well as crosslinkers are given elsewhere in this disclosure. It will be understood with benefit of this disclosure that within these categories, these additional compounds may be used interchangeably in various embodiments of the disclosed method.

In some cases, it may be desirable to select an ionic superabsorbing particle based on the type of formation being treated. As mentioned, the particles may be formed from various monomers, including anionic and cationic monomers. Depending upon the formation being treated, it may be possible that the ionic pendant groups of the particles will tend to be either attracted to or repelled from the formation. For instance, carbonate formations, such as lime, are typically cationically charged. Therefore, it may be desirable to have a superabsorbing particle formed, in part, from cationic monomers in order to minimize adherence to a carbonate formation after a fracture treatment has been performed. In other words, it may be possible that particles with cationic pendant groups may be more easily removed from the formation following fracture treatment, thereby reducing any flow restriction that may be caused by the superabsorbing particles.

Likewise, for silicate-containing formations, which are usually anionically charged, it may be desirable to use a particle that has anionic pendant groups. However, it will be understood with benefit of the present disclosure that particles having cationic, anionic and/or nonionic pendant groups may be successfully used in fracture treatments of any type of formation without regard to ionic polarity. For example, particles with cationic pendant groups may be used in treating silicate formations and particles with anionic pendant groups may be used in treating carbonate formations.

When it is desired to prevent or reduce water production from a water-bearing formation, it may be advantageous to use particles having charges opposite to that of the formation. For example, silicate-containing formations are typically treated with particles having cationic pendant groups, and carbonate-containing formations are treated with particles having anionic pendant groups.

In the practice of the disclosed method, a typical anionic superabsorbing particle composition employs a mixture of acrylamide, acrylic acid and methylenebisacrylamide. A typical cationic superabsorbing particle composition employs a mixture of acrylamide, dimethyldiallylammonium chloride or methacrylamidoethyltrimethylammonium chloride, and methylene bisacrylamide. A typical nonionic superabsorbing composition employs a mixture of methylene bisacrylamide and acrylamide together and/or may also include N-vinyl pyrolidone. It will also be understood with benefit of this disclosure that ionic superabsorbing particle compositions that do not include nonionic monomers may also be employed in the practice of the disclosed method.

Mixed Ionic Compositions

In mixed ionic embodiments of the disclosed method, the aqueous phase of the polymer dispersion typically comprises a monomer solution of two or more monomers. Typically, an anionic monomer and a cationic monomer are used. In one embodiment, the monomer solution may be mixed with a hydrocarbon solvent through emulsion techniques to form a dispersion. As with other embodiments, the polymer dispersion may then inverted in water at the well site prior to injection into the wellbore.

Mixed ionic super absorbing particles of the disclosed method may comprise a vinylamide monomer, a cationic monomer containing ammonium or quaternary ammonium moieties, and a crosslinking monomer. They may further comprise an anionic monomer selected from vinylcarboxylic acids or salts of those acids or vinylsulfonic acids or salts of those acids. The degree of particle swelling may be controlled by salt content or, for vinylcarboxylic salts, by adjusting the pH. Typically, the overall polymer content ranges from about 0.08% to about 15.0% polymer weight to solution weight, and typically comprises from about 0.1% to about 1.5% polymer weight to solution weight.

As previously mentioned, an aqueous phase or monomer solution of the disclosed method typically comprises two or more monomers. The monomers may be mixed together in an aqueous solution so that the monomer content ranges between about 40% to about 70% by weight. The pH of the solution may be neutralized by the slow addition of aqueous sodium hydroxide. The aqueous phase may further comprise a crosslinking monomer so that the polymer chains formed within the micelles of the emulsion are crosslinked during polymerization.

In one typical mixed ionic embodiment, a monomer solution has three components comprising a nonionic vinylamide monomer, a cationic monomer containing ammonium or quaternary ammonium moieties, and a crosslinking monomer. Most typically, the monomer solution contains from about 0 parts to about 5 parts vinylamide monomer of the formula:

$$CH_2=C(R)-C(O)N(R')_2$$

where R represents a hydrogen atom or methyl, ethyl or propyl moiety and R' represents a hydrogen atom or methyl, ethyl or propyl moiety. The vinylamide monomer may also be a vinyllactam such as vinylpyrolidone. Other examples of vinylamide monomers include, but are not limited to, acrylamide, methacrylamide, and N,N-dimethylacrylamide. Typically, the vinylamide monomer comprises acrylamide.

The cationic monomer containing ammonium or quaternary ammonium moieties typically comprises dimethyldiallyl ammonium chloride and ranges from about 0.5 parts to about 5 parts of a polymer dispersion. The chloride counter ion may also be substituted, for example, with any other halogen, sulfate, or phosphate. Other examples include dimethyldiallyl ammonium sulfate, methacrylamido propyl trimethyl ammonium bromide, and methacrylmaido propyl trimethyl ammonium chloride monomers.

Desirably, the monomer solution further comprises an amount of about 50 to about 1,000 ppm crosslinking monomer. Crosslinking monomers are described in U.S. Pat. No. 5,465,792, which is incorporated herein by reference. Typical crosslinking monomers are methylene bisacrylamide, diallylamine, N,N-diallylacrylamide, divinyloxyethane and divinyldiemthylsilane. A most typical crosslinking monomer is methylene bisacrylamide.

In another typical embodiment, an anionic monomer may be used, ranging from about 0 parts to about 5 parts and selected from vinyl carboxylic acids or salts of those acids or vinylsulfonic acids or salts of those acids having the general formula shown below:

$$CH_2=CHC(O)X$$

where X represents moieties containing either a carboxylic acid or salt of that acid or a moiety containing a sulfuric acid or sulfonic acid or salts of those acids. Examples include acrylic acid, acrylamidomethylpropane sulfonic acid, itaconic acid, maleic acid, methacrylic acid, styrene sulfonic acid and vinyl sulfonic acid or the esters or salts of these acids. These salts include ammonium, alkali metal or alkaline earth metal salts. The use of this additional monomer is desirable but not essential in the practice of the disclosed method.

In one typical embodiment of the disclosed method, a composition employs a mixture of acrylamide, acrylic acid and diallyllammoniumchloride. In another embodiment, a typical formulation comprises about 37.7% of non-ionic acrylamide, about 38.5% of anionic sodium acrylate, about 23.7% of cationic dimethyldiallylammonium chloride, and about 0. 1% methylene bisacrylamide crosslinker.

Preparation of Superabsorbing Particles

In the practice of the disclosed method and apparatus, superabsorbing particles may either be internally crosslinked, externally crosslinked or both. External or surface crosslinking differs from internal crosslinking in that it is carried out at the surface of the polymer particle after the polymer particle has been formed.

In one embodiment, a polymer dispersion is prepared as an emulsion or microemulsion that comprises an aqueous phase and a hydrocarbon phase. Invert emulsion polymerization is generally known in the field of polymer chemistry. Such polymerization reactions are disclosed in *Emulsion Polymers and Emulsion Polymerization,* American Chemical Society (ACS) Symposium Series 165 (1981), which is incorporated herein by reference. In general, invert emulsion polymerization involves preparing a solution of the compounds to be polymerized, including monomers, in a water (the aqueous phase). A quantity of oil or other immiscible liquid (the hydrocarbon phase) is then added to the aqueous solution to form an oil-external emulsion, with the internal phase being the water/monomer solution. By applying shear to the mixture, micelles of the water/monomer solution are formed within the immiscible hydrocarbon phase. Emulsifiers or surfactants may also be added to the emulsion. The size of the micelles may be controlled by the type of emulsifier or surfactant used and the amount of shear imposed while forming the emulsion. Polymerization may then be initiated within the micelles so that the micelles form discrete polymerized particles within the oil phase (or polymer dispersion within oil).

Using invert emulsion techniques, superabsorbant particles having relatively small diameters may be formed as described in U.S. Pat. No. 5,465,792, which is incorporated herein by reference. Particles with diameters as small as about 0.001 µm have been achieved using these techniques. The particles may be crosslinked during and/or after the polymer particles have been formed in the emulsion. Emulsions used in the disclosed method typically have micelles with sizes ranging from about 0.005 to about 2 microns. It should be noted that the size of the micelles formed are dependent upon the shear and type of emulsifier used. The type of emulsifier used may vary, however, an emulsifier or blend of emulsifiers having a lipophilic balance (HLB) between about 4 and about 6 is desirable. Suitable emulsifiers include, but are not limited to, nonionic sorbitan fatty esters and esters with low amounts of ethoxylation such that the HLB value ranges between about 4 and about 6.

In preparing the smaller particles in the invert emulsion polymerization, the compounds to be polymerized are dissolved within an aqueous solution. The amount of water solvent used may vary, but it is typically between about 40% and about 65% of the total weight of the water/monomer solution. The amount of reactants also varies. The amount of nonionic hydrophillic monomers, such as acrylamide, may vary between about 30% to about 99.9% by total weight of monomers (twm). The ionic monomers, anionic and/or cationic, may vary between about 0% to about 70% twm. Depending upon the amount of internal crosslinking desired, the amount of divinyl crosslinking monomers may range from between about 0 to about 1.0% twm.

It may sometimes be necessary to neutralize the solution due to the presence of the acidic or basic compounds used in the polymerization. A pH of between about 7 and about 8.5 is desirable for polymerization.

Besides monomers, an aqueous phase may further comprise an emulsifying surfactant. Such surfactants are usually nonionic with hydrophillic lipophilic balance HLB values of the surfactant system ranging from about 3 to about 10, most typically between about 4 and about 8. Low surfactant HLB values are desirable in order to form water-in-oil emulsions. Surfactants are generally added at about 0.5% to about 2% by weight of the emulsion and include ICI's "SPAN"® surfactants and Rhone Poulenc's "IGEPAL"® surfactants. The surfactants, having low HLB values, are usually oil soluble, and alternatively may be added to the hydrocarbon solvent in the hydrocarbon phase.

After the monomer solution is prepared, it is then typically added to an immiscible oil-phase solvent. The amount of the oil phase may vary but typically makes up about ⅓ of the total volume of the emulsion. Typically, the solvent ranges from about 20% to about 50% by weight of the emulsion. The oil-phase solvent is typically a refined oil having a boiling point in excess of about 120° C. These refined oils may be aliphatic, alicyclic or aromatic compounds and mixtures thereof, with the aliphatic compounds being preferred. More preferred solvents are the straight or branched chain alkane oils, such as hexane, having carbon constituents of five carbons or more. Examples of suitable oil-phase solvents are "NORPAR 12", "ISOPAR L" and "ESCAID", all available from Exxon, and white mineral oil, such as 21 USP White Mineral Oil, available from Amoco.

Typically in the practice of the disclosed method, the hydrocarbon phase is slowly added to the aqueous-phase solution while the latter solution is rapidly stirred, and the mixture allowed to homogenize. As described below, after degassing and addition of a catalyst or an initiator, the monomers begin to chemically bond to one another and form high molecular weight polymers, forming a dispersion of solids or polymer particles dispersed in a liquid phase. Throughout this application, the terms emulsion and dispersion may be used interchangeably.

An emulsion is then formed by conventional methods, such as with the use of a homogenizer, where shear is applied to the water/monomer solution to achieve the desired micelle size. Emulsifiers may also be added to the emulsion to help stabilize and further facilitate formation of discrete micelles within the emulsion. Once the emulsion is formed, polymerization is initiated with one or more catalysts. Catalysts may be a single catalyst or a system in which catalysts, co-catalysts, and/or promoters are added. Typical catalysts are free radical oxidizers. Use of co-catalysts and/or promoters may aid in the polymerization of the superabsorbing particles. These promoters act as reducing agents which slow down the release of free radicals. This favors a slow build up of linear, high molecular weight polymers. Typical promoters include sodium sulfite, thionyl chloride and thionyl bromide. These promoters react with the free radical of the catalyst so that the rate of polymerization of the polymer particles is controlled. As described below, oxidizing agents such as the hydroperoxides, for example, cumene hydroxide, and persulfates, such as ammonium persulfate, may be used.

Once the emulsion is formed by mixing the aqueous and hydrocarbon phases, the emulsion is then degassed and polymerization is initiated with the addition of a catalyst or an initiator. The catalyst usually comprises low dosages of peroxides such as cumene hydroperoxide in "NORPAR 12". Typically, the polymerization is initiated by adding about 1 ml of 2% by weight cumene hydroperoxide. Other catalysts suitable for use in the disclosed method include sodium persulfate, ammonium persulfate and t-butyl hydroperoxide. A co-catalyst such as thionyl chloride in "NORPAR 12" or sodium sulfite solution may also be used. Because of the exothermic nature of the reaction initiated by the addition of the catalyst, evidence of the reaction is indicated by an increase in the temperature of the emulsion. Desirably, the temperature of the reacting emulsion should not exceed from about 30° C. to about 40° C., and is most desirably maintained at a constant temperature of about 30° C. in order to promote chain initiation and propagation while minimizing chain termination. However, gradual temperature increases of the reacting emulsion are acceptable.

The emulsion polymerization reactions are typically carried out in an oxygen-free or in a reduced-oxygen environment. Closed reactors in which oxygen has been removed and the reactor has been re-pressurized with nitrogen gas or emulsions where nitrogen gas is bubbled throughout the reacting emulsion are preferred.

The amount of water within the micelles depends upon the amount of water used in preparing the water/monomer solution. For example, if 50% water is used in preparing the water/monomer solution, the amount of water within the micelles will tend to be approximately 50%, with the remainder being polymer. This is a very small amount compared to the amount of water the particles may absorb. If internal crosslinking agents are used in the polymerization, as the polymers grow within the micelles of the invert emulsion, then each micelle ends up being a partially dehydrated, internally crosslinked particle. Larger commercially-prepared superabsorbing particles will typically have a lower water content than those prepared using invert emulsion techniques. Typically the water content is from about 0.5% to about 15%, more typically between about 5% and about 10%, based on the weight of the larger, commercially available polymer particles. Typical water content for polymers made by the emulsion process ranges from about 50% to about 120%, more typically from about 90% to about 110%, based on the weight of the polymer particles.

Surface crosslinking agents may also be added to the emulsion after the polymerization reaction is complete, with or without internal crosslinking. The surface crosslinking agents crosslink certain pendant groups attached to the polymer chains of the polymer particle at or near the particle surface. For example, carboxylate or hydroxyl groups pendant to a polymer chain are crosslinked when reacted with epoxides. These epoxides are typically di-epoxides although they may be multi-epoxides as well. It should be noted that the surface crosslinking may be accomplished either with or without internal crosslinking. Co-polymers containing carboxylated salts may be surface crosslinked with compounds containing di- or multi-epoxides. Suitable surface crosslinking agents include ethylene glycol diglycidyl ether, epihalohydrins (for example, epibromohydrin and epichlorohrydrin), epoxy resins and diglycidyl ethers, such as the diglycidyl ether of 1,4-butanediol. Another class of compounds that provide surface crosslinking are those used to crosslink hydrated polymers. In this case the particles are treated with salts or complexes of metals such as chromium, zirconium, titanium and aluminum before being placed in an aqueous environment. The surface crosslinking agents are typically added in an oil-phase carrier and mixed with the emulsion. The amount of surface crosslinking agents may range from about 0.0001% to about 5%, based on the weight of the polymer. Typically the amount of surface crosslinking agent is from about 0.01% to about 1%.

In another embodiment, the emulsion may be further treated with inverting surfactants after polymerization is complete. Suitable inverters include 10 mole nonylphenol ethoxylates or $C_{9-18}$ dialkanolquatenary ammonium chlorides at concentrations less than about 5% by weight, based on the emulsion. A typical inverting surfactant is 10 mol nonylphenol ethoxylate. These surfactants promote easy inversion of the emulsions in the subterranean formation or at the well site, so that the polymer particles are allowed to interact with the aqueous phase and swell.

Fluid Loss Control During Fracture Treatments

The superabsorbing particles of the disclosed method may be employed to control fluid loss in the treatment of any formation suitable for fracturing including, but not limited to, sandstone and carbonate reservoirs.

In one embodiment, a method for controlling fluid loss during a hydrocarbon-based fracture treatment is provided, and comprises forming a polymer dispersion of the disclosed method, combining the polymer dispersion with an inverting surfactant (typically by adding the inverting surfactant to the dispersion), and combining the polymer dispersion with a carrier fluid (typically be adding the dispersion to the carrier fluid) so that the polymer particles are dispersed throughout, to form a polymer treatment fluid. For example, a product such as "AQUATROL V" (available from B.J. Services Company) may be deployed as part of a gelled oil treatment fluid. As used herein, the terms "combine" or "combining" include any method suitable for admixing, exposing, contacting, or otherwise causing two or more materials, compounds, or components to come together. Fracture proppant and/or small amounts of water, usually less than about 0.5% (based on the total weight of treatment fluid), may then be added to or combined with the polymer treatment fluid to form a proppant-laden polymer treatment fluid, which is then injected into the formation. Typically such a polymer treatment fluid is a hydrocarbon fluid comprising between about 0.1% and about 0.5% water, based on total volume of the polymer treatment fluid.

In the practice of the disclosed method, any size superabsorbing particles suitable for reducing fluid loss to a formation during a fracture treatment may be employed. These may be very small particles (i.e., particles having diameters ranging from about 0.1 $\mu$m to about 5 $\mu$m) or may be larger (i.e., particles having diameters ranging from about 5 $\mu$m to about 300 $\mu$m in diameter). Typically, superabsorbing particles having diameters ranging from about 0.1 $\mu$m to about 100 $\mu$m are used. More typically, particles having diameters ranging from about 0.5 $\mu$m to about 5 $\mu$m are employed. Smaller particles are typically suspended in a hydrocarbon carrier fluid in an amount between about 25% to about 45% by weight. Larger particles are typically are suspended in a hydrocarbon carrying fluid in an amount between about 0.5% to about 5% by weight. The hydrocarbon carrier is desirably a refined oil such as may be used with the invert emulsion.

In the practice of the disclosed method, an invert emulsion or polymer dispersion of superabsorbing particles may be employed with many different hydrocarbon-based fluids (such as hydrocarbon solvents), and/or other types of fluids, as well as proppant materials. For example, suitable hydrocarbon-based carrier fluids may include, but are not limited to, refined oils such as kerosene, gasoline or diesel, unrefined wellhead products such as crude oil or condensate, or aromatic solvents such as xylene and toluene. One specific example of a suitable refined hydrocarbon is known as "FRACSOL," available from Amsol. When used, hydrocarbon-based fluid may include no additives, or may include additives that increase its native (initial) viscosity by means of crosslinking or otherwise. Mixtures of these and other hydrocarbons are also possible. Any suitable amount of emulsion may be added to or combined with a separate carrier fluid to achieve a desirable concentration of emulsion in a hydrocarbon-based polymer treatment fluid when the carrier fluid is added thereto. Once an invert emulsion is prepared in the appropriate concentration, the invert emulsion may be added to or combined with a hydrocarbon-based fracture fluid or separate hydrocarbon carrier fluid as described above.

Typically, when a hydrocarbon fracture fluid or carrier fluid contains no aqueous fluids, the particles within an emulsion are initially small and unswollen. However, if the hydrocarbon fluid contains some concentration of water, the particles will begin to swell. The amount of swelling is dependent, among other things, upon the size of the particles, the amount of crosslinking, branch intermeshing between the polymer particles, the presence of salt within the aqueous fluids and the particles' affinity to water due to the number of functional groups on the polymer chains. Swelling also tends to increase in a manner proportional to the amount of water present in the fluid. As discussed, particles may swell anywhere from about 10 to about 1,000 times their original size.

Once the superabsorbing particles are prepared as a polymer dispersion in oil (or invert emulsion) as described above, the emulsion may be added to or combined with a suitable carrier fluid, typically a hydrocarbon-based fluid to form a polymer treatment fluid. In a typical embodiment, a polymer treatment fluid comprises a diesel carrier fluid, from about 0.2% to about 1.5% (based on volume of treating fluid) $C_5$ to $C_{12}$ organophosphate ester, from about 0.05% to about 1.5% activator (aluminum or iron-based salts), a gel-degrading substance such as sodium bicarbonate or sodium acetate, and from about 0.1% to about 1.5% superabsorber polymer particle dispersion (based on total volume of polymer treatment fluid). More typically, a polymer treatment fluid comprises a diesel carrier fluid, from about 0.4% to about 1.0% (based on volume of treating fluid) $C_5$ to $C_{12}$ organophosphate ester, from about 0.2% to about 1.2% activator (aluminum or iron-based salts), a gel-degrading substance such as sodium bicarbonate or sodium acetate, and from about 0.1% to about 0.4% superabsorber polymer particle dispersion.

An inverting surfactant may also be added or combined as previously described. In a typical embodiment, from about 0% to about 5% volume (based on the volume of polymer emulsion) inverting surfactant is added. If a high concentration of particles are formed in the invert emulsion, the emulsion may be very viscous, however, because there is little if any affinity between particles, such emulsions typically pour very easily. Additional emulsifiers may be added or combined to disperse the invert emulsion in a carrier fluid. In the disclosed method and apparatus, typical polymer concentrations range from about 0.04 to about 1.0% (based on weight). In Examples 5 and 6, based on standard API fluid loss testing, the most effective polymer emulsion content ranged from about 0.1% to about 0.42% (volume of polymer emulsion/volume of polymer treatment fluid).

The polymer treatment fluid may be prepared at the well site and may be batch-prepared or prepared by continuous mix processes. In one embodiment, the polymer treatment fluid is prepared by combining the alkylphosphate ester, the polymer emulsion and from about 0.5% to about 1.5% water with a suitable hydrocarbon-based solvent such as diesel. After adequate mixing, an iron- or aluminum-based activator, a delayed gel-degrading substance, breaker, and proppant are typically added or combined, resulting in gelation of the fluid. During gelation, the fluid is pumped to the wellbore at pressures sufficient to fracture the formation. Other additives, including but not limited to emulsion preventing substances, may also be added or combined with the fluid prior to gelation.

With gentle mixing, the polymer emulsion, together with the small amounts of water, inverts to allow the polymer particles to swell in the hydrocarbon-based gel. Once swollen, the particles essentially form microgels dispersed in the hydrocarbon solvent. Among other things, these microgels are typically able to filter out onto a fracture face during a fracture treatment, restricting further fluid loss. The effect of various solvents on the degree of swelling is presented in Table 1.

TABLE 1

Swelling of Polymer Particles in Various Solvent Systems

| Solvent System | Concentration (% wt) for 5 cP viscosity | Volumetric Swelling Ratio | Polymer Particle Diameter |
|---|---|---|---|
| Isopar-L | 45% | — | 0.5–1 micron |
| deionized water | 0.5% | 90 | 4–5 times unswollen diameter |
| 2% KCl (pH 8–9) | 2.5% | 18 | 2.5 times unswollen diameter |
| 2% KCl (low pH) | 4% | 11 | 2.2 times unswollen diameter |

Once the polymer treatment fluid is prepared, the fluid is injected or otherwise introduced into the subterranean formation, typically with a fracture proppant as part of a proppant-laden polymer treatment fluid. In another embodiment, the polymer treatment fluid may be prepared by continuous mix processes, wherein the components are mixed together while the fluid is simultaneously introduced into the wellbore. By "introduced" it is meant that the fluid may be pumped, injected, poured, released, displaced, spotted, circulated or otherwise placed within a well, wellbore, and/or formation using any suitable manner known in the art. It will be understood with benefit of this disclosure that polymer emulsion may be added to or combined with a carrier fluid at any point prior to introduction into a wellbore, and may be used in all or part of a fracture treatment volume. In addition, it will be understood that polymer emulsions of the disclosed method may be used to control fluid loss to a subterranean formation during non-fracturing type treatments such as, for example, diesel breakdowns of perforations and other near wellbore treatments.

When used to control fluid loss during a hydraulic fracture treatment, typical introduction rates for either a batch or continuous mixed polymer treatment fluid should be above rates that cause pressures to exceed those necessary to fracture a formation. During introduction, the rates may be adjusted to ensure that pressures are maintained above those necessary for fracturing, if desired.

In one embodiment, a well is typically treated using a fracture fluid having from about 0.05% to about 2% by volume of an emulsion within the fracturing fluid. In this case, the emulsion typically has between about 25% to about 45% polymer particles by weight of emulsion. Most typically a fracture fluid has from about 0.1% to about 0.5% by volume of an emulsion, with from about 30% to about 40% polymer particles by weight of emulsion. Advantageously, these volumes are considerably less than volumes of conventional carbohydrate polymers typically employed for fluid loss control in hydrocarbon-based fracture fluids.

In the practice of the disclosed method, wells are typically fractured (or otherwise treated) with hydrocarbon-based polymer treatment fluids containing a minimum of about 0.1% (vol.) water. More typically hydrocarbon-based polymer treatment fluids containing from about 0.1% to about 1.5% water are used. Most typically, hydrocarbon-based polymer treatment fluids containing from about 0.1% to about 0.5% water (based on total volume of polymer treatment fluid) are employed. However, it will be understood with benefit of the present disclosure that although swelling and fluid loss prevention effectiveness may increase with water concentration, desirable water concentration in any individual case may depend on many other factors, for example formation rock properties and formation sensitivity to water. In addition, it will be understood that fluid loss benefits may be obtained when using the disclosed superabsorbing particle compositions in water-based fracturing fluids.

In those cases where a hydrocarbon fluid contains adequate initial water concentration to cause sufficient particle swelling for fluid loss control (as may be true in the case of unrefined fluids such as crude oil), it may be desirable to add no additional water prior to pumping a fracture treatment. However, in those cases where a hydrocarbon fluid contains little or no water (as may be the case with refined fluids such as diesel), it is typically desirable to add or combine sufficient water to obtain water concentrations as outlined above. Water contained in other solutions combined with a hydrocarbon-based fracture fluid may also contribute to particle swelling and reduce the need for additional water such as, for example, when water-based ionic metal activator solutions are added or combined with a hydrocarbon-based fracture fluid.

Fracture proppants that may be employed in the practice of the disclosed methods include any suitable fracture proppant known to those skilled in the art including, but not limited to silica (such as Ottawa, Brady or Colorado Sands), synthetic organic particles, glass microspheres, ceramics (including aluminosilicates such as "CARBOLITE," "NAPLITE" or "ECONOPROP"), resin-coated sand (such as "ACME BORDEN PR 6000" or "SANTROL TEMPERED HS"), sintered bauxite, resin-coated ceramic particles, resin-coated sintered bauxite, and mixtures thereof. Typically, sand or synthetic fracture proppants are used. Most typically, sand is used as a fracture proppant. However, it will be understood with benefit of the present disclosure that superabsorbing microparticles of the disclosed method may also be employed successfully with well treatments employing no proppants including, for example, hydrocarbon-based treatments such as "condensate treatments", other similar treatments which may be employed to remove asphaltenes or other heavy hydrocarbon deposits from a wellbore or formation, or any other type of treatment wherein reduction in fluid loss is desired.

When used in water-based treatments, superabsorbers with particular ionic groups may be preferred when treating formations having a high salt content or in acidic or alkaline conditions. The type of superabsorbing particles used depends on the type of salt and/or the pH of the polymer treatment fluid and/or fluids of the formation to be treated. Particles with ionic groups are preferred for use under acid or brine conditions. When treating formations with high salt content, superabsorbers with a large number of ionic groups are preferred. For example, sulfonated superabsorbers are both salt- and acid-tolerant and may be used in heavy brines or acidic fluids. It should be noted, however, that while superabsorbing particles formed using ionic monomers are preferred in many instances, they are not essential. Superabsorbing particles may be polymerized using nonionic monomers alone or with other ionic monomers. The superabsorbing polymers of the disclosed method, however, are typically copolymers of the nonionic and ionic hydrophillic monomers.

Control of Water Production and Fracture
Extension into Water-Bearing Formations The superabsorbing particles of the disclosed method may be used during a hydraulic fracturing treatment at concentrations sufficient so that they interact with formation water as they are leaked off to a formation so as to minimize production of formation water after a well is returned to production. This may be particularly advantageous when fracturing productive formations that are in close proximity to water-bearing formations. In such situations, for example, a vertical fracture may be induced during a treatment of a hydrocarbon-bearing zone. This vertical fracture may encounter water-bearing (or water productive) zones of the same formation or of other nearby formations. At this time, some of the superabsorbing particles of the disclosed method penetrate into the formation. These particles encounter formation water of the water-bearing zones or areas, either initially during the treatment or later during well flowback. When this occurs, the superabsorbing particles swell and/or swell further and are believed to reduce resultant water production in at least one of two ways.

First, while not wishing to be bound by theory, during a fracture treatment employing the particles, swelling (such as interstitial swelling) of the particles in a water-bearing formation is believed to increase the stress in the formation, thus forming a stress barrier in the formation. Such a stress barrier tends to limit the growth of a fracture into water-bearing formations (or water-bearing areas of a formation) by diverting fracture growth to lower stressed formations (or areas of a formation). Second, swelling of the superabsorber particles in water-bearing formations (or water-bearing areas of a formation) tends to plug or otherwise block flow of water from a formation when a well is placed on production. Advantageously, the disclosed method and compositions are selective because swelling or further swelling only occurs in water-laden areas of a formation. Such a selective system is one that is relatively non-damaging to oil permeability in an oil saturated formation while decreasing water permeability in water saturated areas or zones.

When used to control water production or fracture extension into water-bearing zones, the superabsorber particles may be present in any or all stages of a hydraulic fracture treatment. For example, superabsorber particles may be employed preceding, during, and/or after a proppant-laden treatment fluid stage of a fracture treatment, such as in a pad stage, a proppant stage, a flush stage or in all three. When used to control fracture extension into water-bearing formations, the particles are, at a minimum, typically present in the pad. In this embodiment, typical components of polymer treatment fluids, including concentrations of superabsorber particles, are the same as those listed elsewhere in this patent for other embodiments of the disclosed method.

In another embodiment of the disclosed method directed toward water production control, an increased concentration of hydrophillic swelling particles may be employed in a polymer treatment fluid. In this regard, any concentration suitable for controlling water production following a fracture treatment may be employed, including any such concentration greater than about 0.1% by volume of hydrophillic swelling particles. Typically, a concentration of swelling particles that is between about 0.1% and about 20%, more typically between about 0.1% and about 10%, and most typically between about 1% and about 10% by volume of the treating fluid is employed in a nonaqueous treating fluid that is otherwise the same as used in other embodiments of the disclosed method. In this embodiment, the increased concentration of particles results in a percentage of particles that are relatively unswollen. These unswollen particles have a greater tendency to leak off into the formation where they swell upon contact with formation water and serve to limit fracture extension and/or plug or otherwise block production of formation water as described above. Although typical swelling particle concentrations have been described above, it will be understood that concentrations less than about 0.1% and greater than about 20% by volume of a treating fluid may also be employed.

In any case, a well may be shut-in for a period of time following a treatment to enhance polymer retention in water bearing formations or water bearing areas of a formation. Typically, such a shut-in time is from about 4 to about 48 hours, and more typically from about 4 to about 24 hours, although any other suitable shut-in time may also be employed.

EXAMPLES

The following examples are illustrative and should not be construed as limiting the scope of the invention or claims thereof.

The following examples illustrate the utility of the disclosed method and serve to further illustrate the method and techniques used in treating subterranean formations. Permeabilities were determined using testing procedures established by the American Petroleum Institute and specified in API RP-27 (3rd Edition). Particle size was determined with conventional scanning electron microscopy techniques and measured from photomicrographs.

Example 1

An invert emulsion was prepared by combining 173.15 g of acrylamide as an nonionic monomer, 35.13 g of acrylic acid as an anionic monomer and 0.264 g of methylene bisacrylamide as an internal crosslinking agent to 125.40 g of deionized water. The solution was then neutralized by the slow addition of 77.82 g of a 25% aqueous sodium hydroxide solution to a pH of 7.46.

The oil phase was prepared by adding emulsifiers of 12.00 g of "HYPERMER 2296", available from ICI Americas, Inc., and 2.50 g of "IGEPAL CO-630", available from Rhone-Poulenec, to 179.65 g of "NORPAR 12". The aqueous phase or solution was then slowly added to the oil phase while homogenizing for four minutes at 24,000 rpm with a Janke Kunkel Ultra Turrax homogenizer. The emulsion was then cooled to approximately 8° C. and degassed by bubbling nitrogen gas through the emulsion, while stirring in a resin kettle. The polymerization was initiated with a 1 ml solution of 2% by weight cumene hydroperoxide in "NORPAR 12". A co-catalyst solution was prepared by adding three drops of thionyl chloride to 10 ml of "NORPAR 12" that was then slowly added throughout the polymerization. With the addition of the first few drops of co-catalyst solution, the emulsion temperature began to increase. Within thirty seconds, the temperature rose from approximately 8° C. to 49° C. and after 5 minutes, peaked at 94° C. The emulsion was then cooled to room temperature. The viscosity of the resulting emulsion was 90.5 cps at 511/s as measured on a Fann 35 viscometer using a 2% by weight of emulsion in deionized water. The particles formed in the emulsion had an average particle size of 0.5 micron. This example shows the ease of preparing anionic-based superabsorbers using invert polymer emulsion processing.

Example 2

The polymerization in Example 1 was repeated except that the aqueous monomer phase was modified using the following monomer composition: 78.8 g acrylamide, 79.9 g acrylic acid, and 82.2 g of 60% aqueous dimethyldiallyl ammonium chloride, all dissolved in 92.5 g of deionized water. In addition, 0.052 g of methylene bisacrylamide was added as the crosslinking monomer. The solution was neutralized to pH 7.92 by the slow addition of 88.49 g 50% aqueous NaOH. The hydrocarbon phase was prepared and mixed with the aqueous phase as described in Example 1. Polymerization was initiated with 1 ml of 2% by weight cumene hydroperoxide co-catalyzed with 5 drops of thionyl chloride in 10 ml of "NORPAR 12". The emulsion's polymerization exotherm reached 97° C. and was then cooled slowly to ambient temperature. The viscosity, measured on a Fann 35 viscometer, of a 2% by weight emulsion in deionized water was 15 cps at 511 $sec^{-1}$. This example shows the ease of preparing cationic-based superabsorbers using invert polymer emulsion processing.

Example 3

In this example, an oil gel was prepared by mixing 1% (vol.) alkylphosphate ester and 0.04% polymer added as a 40% (wt.) active invert polymer emulsion. The polymer was composed of 37.8% acrylamide, 38.4% acrylic acid, 23.7% dimethyldiallyl ammonium chloride and 0.1% methylenebisacrylamide (known as "AQUATROL V" available from B.J. Services Company). 1.2% (wt.) of a 40% aqueous urea solution was added to cause the fluid to slowly thin. (This is necessary in the fracturing process to recover the fluid while leaving the proppant in place.) The solution was gelled by addition of 1% (wt.) of a ferric sulfate solution. Gelation occurred within 10 sec.

Then, 45 g of gel was weighed into a Fann 50C sample cup. After placing the cup on the Fann viscometer, the fluid was continuously sheared at 42 $sec^{-1}$ while heating to 200° F. Every 30 min, a rate sweep using 105, 78, 52 and 26 $sec^{-1}$ was made to determine the Power Law indices, n' and K. This process is described in the American Petroleum Institute's publication RP-45. Note that the viscosities presented in Table 2 are calculated from the determined Power Law indices.

The results of this example show that hydrophillic superabsorbing polymers of the disclosed method are compatible with hydrocarbon-based fracturing fluids and that they do not impede viscosity development nor alter the long term stability of these fluids.

TABLE 2

Temperature (° F.): 200
Additives: No. 2 Diesel, 1.0% Alkylphosphate ester, 0.04% polymer (invert polymer emulsion), 1.0% Ferric sulfate solution.

| Time (min.) | Temp (° F.) | n' | K dyne/$cm^2$ | 105 | 42 $s^{-1}$ |
|---|---|---|---|---|---|
| 4 | 75 | .004 | 318.857 | 309 | 771 |
| 34 | 198 | .229 | 205.327 | 568 | 1151 |
| 64 | 199 | .176 | 272.595 | 589 | 1253 |
| 94 | 199 | .158 | 300.555 | 597 | 1292 |
| 124 | 199 | .139 | 328.181 | 597 | 1314 |
| 154 | 199 | .137 | 326.299 | 588 | 1296 |

TABLE 2-continued

Temperature (° F.): 200
Additives: No. 2 Diesel, 1.0% Alkylphosphate ester, 0.04% polymer (invert polymer emulsion), 1.0% Ferric sulfate solution.

| Time (min.) | Temp (° F.) | n' | K dyne/$cm^2$ | 105 | 42 $s^{-1}$ |
|---|---|---|---|---|---|
| 184 | 200 | .142 | 307.840 | 568 | 1246 |
| 214 | 201 | .16 | 271.326 | 544 | 1175 |
| 244 | 199 | .145 | 273.793 | 512 | 1121 |
| 273 | 199 | .131 | 272.131 | 477 | 1057 |
| 291 | 199 | .132 | 260.724 | 459 | 1017 |
| 321 | 201 | .135 | 243.71 | 435 | 961 |
| 351 | 199 | .138 | 232.215 | 420 | 926 |
| 381 | 199 | .128 | 229.275 | 396 | 881 |
| 411 | 201 | .142 | 199.092 | 367 | 806 |
| 441 | 199 | .131 | 189.495 | 332 | 736 |
| 471 | 199 | .119 | 181.280 | 300 | 673 |
| 501 | 201 | .116 | 168.861 | 276 | 620 |
| 531 | 199 | .107 | 165.676 | 260 | 588 |

Example 4

The fluid loss control of an oil gel without fluid loss control additive was measured at 200° F. The fluid was prepared in No. 2 diesel containing 1% (vol.) alkylphosphate ester and 1% (vol.) iron-based activator. A sample of 150 ml of gel was placed in a Baroid high pressure filter press and heated to 200° F. while increasing pressure to 1,000 psi. The filtering media was three pieces of Baroid filter paper. After about 30 min, the test was started by opening the bottom stem of the press while simultaneously starting a stop watch. Data were collected by measuring the filtrate volume in a graduated cylinder at 1, 4, 9, 16 and 25 min. Because of lack of fluid loss control, $C_{III}$ was calculated as described in the API's RP-45. The $C_{III}$ value for this fluid was 0.180 ft/$min^{1/2}$ and is regarded as poor control. Table 3 and FIG. 1 show the amount of filtrate collected over time expressed as the square root of time. Typically, the volume of filtrate over the square root of time is very linear. The slope of this curve is used to calculate the $C_{III}$ value.

The results of Example 4 show that although hydrocarbon-based gels have adequate viscosity as fracturing fluids, they have extremely poor fluid loss control. This example shows the need for the superabsorber polymer fluid-loss additive of the disclosed method.

TABLE 3

Fluid Loss Calculations

| Filter Media: | 3 Baroid filter papers |
|---|---|
| Additives: | No. 2 Diesel, 1.0% alkylphosphate ester and 1.0% ferric sulfate solution |
| Test Temperature: | 200° F. |
| Test Pressure: | 1,000 PSI |

| Time (Minutes) | Fluid Loss (ml.) |
|---|---|
| 0.25 | 25.00 |
| 1 | 150.00 |
| 9 | |
| 16 | |
| 25 | |
| 36 | |

Cross Sectional Area of Filter = 22.8 $cm^2$
$C_{III}$ = 0.1798 ft/$min^{1/2}$

Example 5

Figure 2:
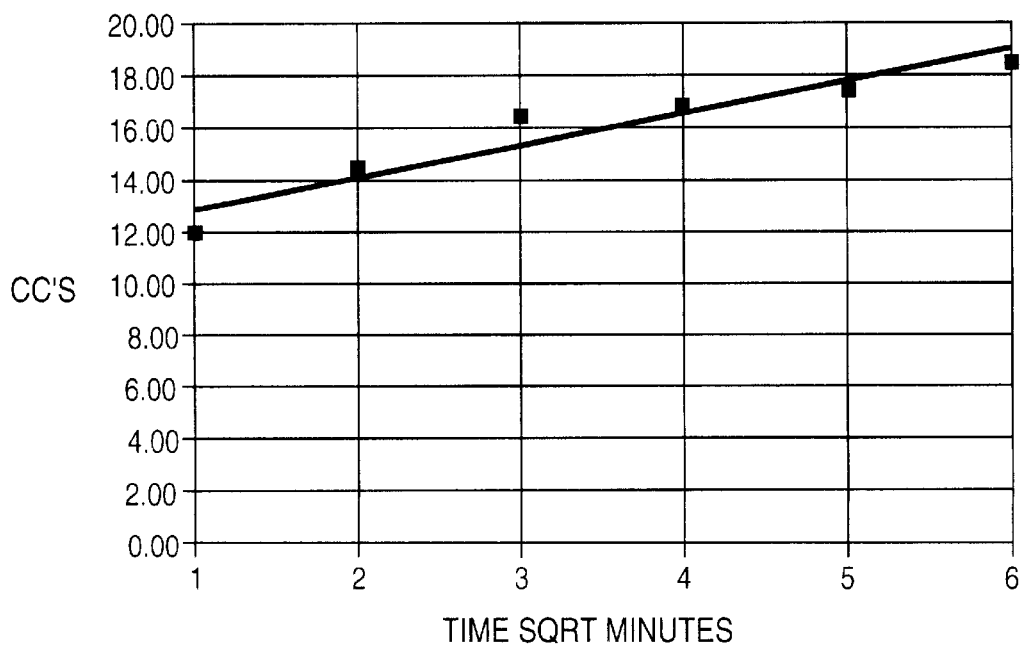
FIG. 2 shows fluid loss as a function of time for an oil gel including an invert polymer emulsion according to one embodiment of the disclosed method.

The study in Example 2 was repeated, except that 0.1% (wt.) polymer described in Example 3 and 1.2% (vol.) of 40% aqueous urea solution was added to the composition described in Example 4. The test temperature was 200° F., pressure 1,000 psi and the filtering media was three pieces of Baroid filter paper. The $C_{III}$ was 0.0009 ft/min$^{1/2}$ or 200 times improvement over Example 4. Table 4 and FIG. 2 show a substantial decline in filtrate as compared to the previous example. The results of Example 5 shows dramatic improvement in fluid loss control with even small amounts of superabsorber polymer.

TABLE 4

Fluid Loss Calculations

| | |
|---|---|
| Filter Media: | 3 Baroid filter papers |
| Additives: | No. 2 Diesel, 0.1% Polymer (invert polymer emulsion), 1.0% alkylphosphate ester and 1.0% ferric sulfate solution. |
| Test Temperature: | 200° F. |
| Test Pressure: | 1,000 PSI |

| Time (Minutes) | Fluid Loss (cc's) |
|---|---|
| 0.25 | 12.00 |
| 1 | 14.50 |
| 9 | 16.50 |
| 16 | 16.90 |
| 25 | 17.60 |
| 36 | 18.60 |

Cross Sectional Area of Filter = 22.8 cm$^2$
$C_{III}$ = 0.0009 ft/min$^{1/2}$

Example 6

Figure 3:
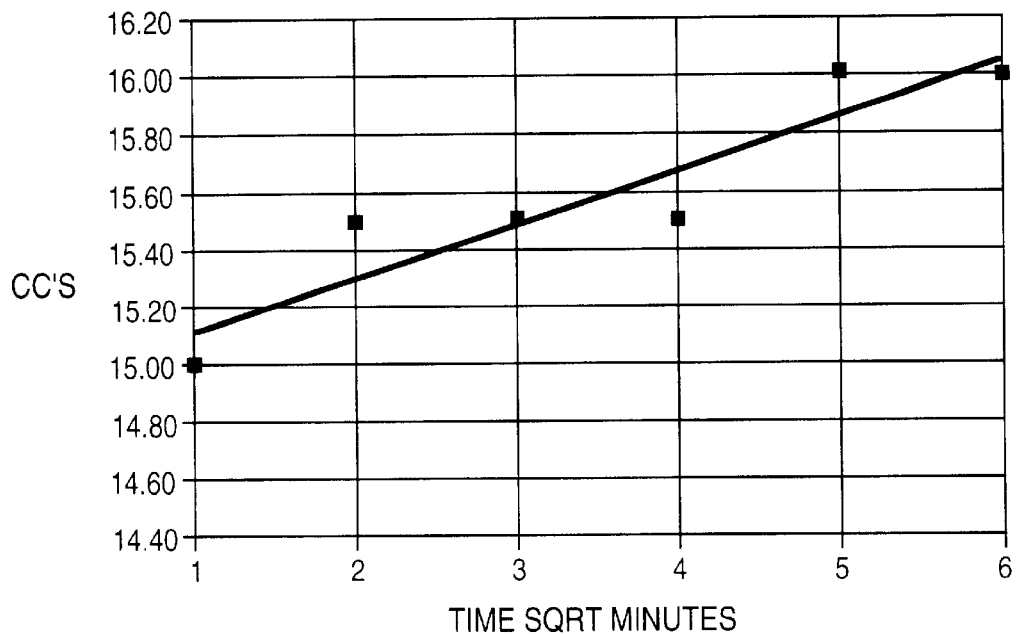
FIG. 3 shows fluid loss as a function of time for an oil gel including an invert polymer emulsion according to another embodiment of the disclosed method.

The study in Example 5 was repeated except that the polymer described in Example 3 was increased to 0.42% (wt.). The temperature, pressure and filtering media were the same as Example 10. The $C_{III}$ value further declined to 0.0001 ft/min$^{1/2}$ for 1,800 times improvement over Example 4. Table 5 and FIG. 3 show that at one minute time, the fluid loss is relatively the same as in the preceding example. However, as time continues the fluid loss improves, losing only 1 ml of fluid over the next 35 min.

The results of this example shows that fluid loss control effectiveness of a superabsorber polymer additive is dependent, in part, on its concentration. Based on $C_{III}$ values, there was a nine-fold improvement in fluid loss control compared to the preceding example by increasing the polymer concentration 4.2 times.

TABLE 5

Fluid Loss Calculations

| | |
|---|---|
| Filter Media: | 3 Baroid filter papers |
| Additives: | No. 2 Diesel, 0.42% Polymer (invert polymer emulsion), 1.0% alkylphosphate ester and 1.0% ferric sulfate solution. |
| Test Temperature: | 200° F. |
| Test Pressure: | 1,000 PSI |

| Time (Minutes) | Fluid Loss (cc's) |
|---|---|
| 0.25 | 15.00 |
| 1 | 15.50 |
| 9 | 15.50 |
| 16 | 15.50 |
| 25 | 16.00 |
| 36 | 16.00 |

Cross Sectional Area of Filter = 22.8 cm$^2$
$C_{III}$ = 0.0001 ft/min$^{1/2}$

Example 7

Figure 4:
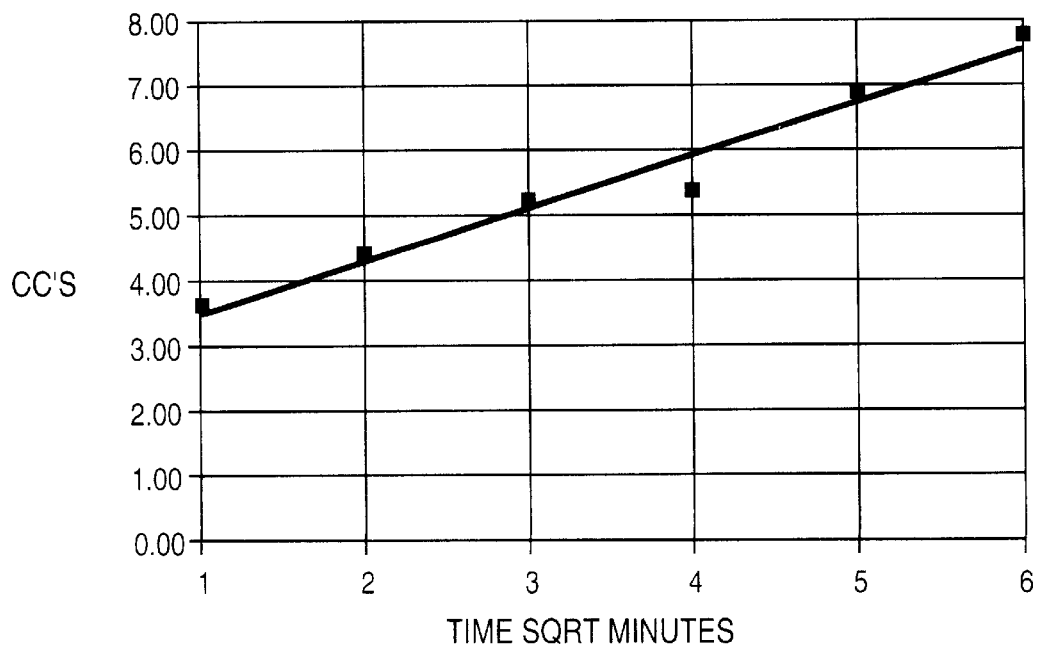
FIG. 4 shows fluid loss through a Berea core as a function of time for an oil gel without fluid control additive.
Figure 5:
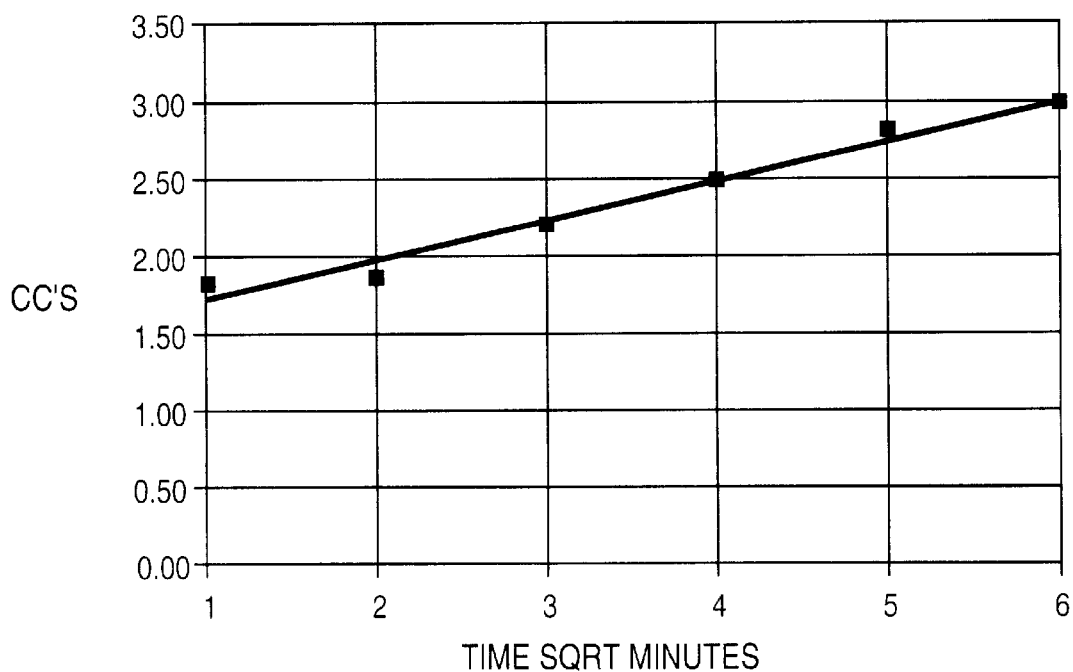
FIG. 5 shows fluid loss through a Berea core as a function of time for an oil gel including an invert polymer emulsion according to one embodiment of the disclosed method.

The studies in Example 4, 5, and 6 were repeated except that the pressure was reduced to 100 psi and the filtering media was a 1" diameter by 1" length Berea core having 10 md permeability. A fluid containing 0.2% (wt.) superabsorber polymer was compared to a fluid without superabsorber polymer. Table 6 and FIG. 4 show the volume of filtrate collected over time expressed as the square root of time for the fluid without polymer. Table 7 and FIG. 5 show the volume of filtrate collected over time expressed as the square root of time for the fluid with superabsorber polymer. This example shows that the superabsorber-based fluid provided enhanced fluid loss control over the fluid without superabsorber polymer.

| | Fluid with polymer | Fluid without polymer |
|---|---|---|
| $C_{III}$ (ft/min$^{1/2}$) | 0.0008 | 0.0027 |

TABLE 6

Without Polymer - Fluid Loss Calculations

| | |
|---|---|
| Filter Media: | Using 1 inch Berea core @ 10 md range. |
| Additives: | No. 2 Diesel, 1.0% alkylphosphate ester and 1.0% ferric sulfate solution. |
| Test Temperature: | 200° F. |
| Test Pressure: | 100 PSI |

| Time (Minutes) | Fluid Loss (cc's) |
|---|---|
| 1 | 3.60 |
| 4 | 4.40 |
| 9 | 5.20 |
| 16 | 5.40 |
| 25 | 6.90 |
| 36 | 7.80 |

Cross Sectional Area of Filter = 5.07 cm$^2$
$C_{III}$ = 0.0027 ft/min$^{1/2}$

TABLE 7

With Polymer - Fluid Loss Calculations

| | |
|---|---|
| Filter Media: | Using 1 inch Berea core @ 10 md range. |
| Additives: | No. 2 Diesel, 0.2% polymer (invert polymer emulsion), 0.5% tap water, 1.0% alkylphosphate ester and 1.0% ferric sulfate solution. |
| Test Temperature: | 200° F. |
| Test Pressure: | 100 PSI |

| Time (Minutes) | Fluid Loss (cc's) |
|---|---|
| 1 | 1.80 |
| 4 | 1.85 |
| 9 | 2.20 |
| 16 | 2.50 |
| 25 | 2.80 |
| 36 | 3.00 |

Cross Sectional Area of Filter = 5.07 cm$^2$
$C_{III}$ = 0.0008 ft/min$^{1/2}$

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed compositions and methods may be utilized in various combinations and/or independently. Thus the invention is not limited to only those combinations shown herein, but rather may include other combinations.

What is claimed is:

1. A method of treating a subterranean formation, comprising:
introducing a viscosified polymer treatment fluid into at least a portion of said formation, said viscosified polymer treatment fluid comprising first and second additives, wherein said first additive viscosities said fluid; and
wherein said second additive differs from said first additive and comprises a dispersion of water swellable particles, said particles comprising synthetic hydrophillic polymers that are crosslinked so that said particles are insoluble in water, said particles comprising between about 30% and about 99.9% nonionic hydrophillic monomer by total weight of monomers; and
wherein said polymer treatment fluid is introduced into said formation at a pressure above a fracturing pressure of said formation.

2. The method of claim 1, wherein said polymer treatment fluid is introduced into said formation as part of a proppant-laden treatment fluid comprising a mixture of a fracture proppant material and said polymer treatment fluid.

3. The method of claim 1, wherein said polymer treatment fluid is introduced into said formation preceding or following a proppant-laden treatment fluid comprising a fracture proppant material.

4. The method of claim 1, wherein said synthetic polymers are internally crosslinked.

5. The method of claim 1, wherein said synthetic polymers are formed by polymerizing monomers in an oil external emulsion.

6. The method of claim 1, wherein said synthetic polymers comprise at least one nonionic monomer.

7. The method of claim 1, wherein said synthetic polymers comprise ionic and nonionic monomers.

8. The method of claim 7, wherein said monomers comprise anionic and nonionic monomers.

9. The method of claim 7, wherein said monomers comprise cationic and nonionic monomers.

10. The method of claim 7, wherein said monomers comprise cationic, anionic, and nonionic monomers.

11. The method of claim 2, wherein said fracture proppant material comprises at least one of sand, resin-coated sand, ceramic particles, synthetic organic particles, glass microspheres, sintered bauxite, resin-coated ceramic particles, resin-coated sintered bauxite, or a mixture thereof.

12. The method of claim 1, wherein said dispersion of water swellable polymer particles are introduced into said formation as part of a fracturing treatment fluid, and wherein said dispersion of polymer particles is present in said fracturing treatment fluid in a concentration of between about 0.1% and about 1.5% by volume of said fracturing treatment fluid.

13. The method of claim 1, wherein said formation is a hydrocarbon-bearing formation having water-bearing areas or is a hydrocarbon-bearing formation located adjacent to a water bearing formation, wherein a fracture is induced in said hydrocarbon-bearing formation during said treatment, and wherein said polymer particles interact with said water-bearing areas of said hydrocarbon-bearing formation or with said adjacent water bearing formation so as to limit growth of said fracture into said water-bearing areas of said hydrocarbon-bearing formation or said adjacent water-bearing formation.

14. The method of claim 1, wherein said formation is a hydrocarbon-bearing formation having water-bearing areas or is a hydrocarbon-bearing formation located adjacent to a water bearing formation, wherein a fracture is induced in said hydrocarbon-bearing formation during said treatment, and wherein said polymer particles interact with said water-bearing areas of said hydrocarbon-bearing formation or with said adjacent water bearing formation so as to restrict the flow of fluids from said water-bearing areas of said hydrocarbon-bearing formation or said adjacent water-bearing formation following said treatment.

15. A method of treating a subterranean formation with a viscosified polymer treatment fluid comprising a viscosifying agent additive and a water swellable polymer additive, said method comprising:
forming a dispersion of water swellable particles, said particles comprising synthetic polymers that are crosslinked so that said polymers are insoluble in water;
combining an inverting surfactant with said dispersion of water swellable crosslinked polymer particles to form said water swellable polymer additive;
combining said water swellable polymer additive with a carrier fluid and said viscosifying agent additive to form said viscosified polymer treatment fluid;
wherein said viscosifying agent additive is capable of imparting viscosity to said polymer treatment fluid in the absence of said water swellable particle additive; and
wherein said polymer treatment fluid is introduced into said formation at a pressure above a fracturing pressure of said formation.

16. The method of claim 15, wherein said carrier fluid comprises hydrocarbon-based fluid.

17. The method of claim 16, wherein said water swellable crosslinked polymer particles are formed by invert polymer emulsion.

18. The method of claim 16, wherein said water swellable crosslinked polymer particles have a size ranging from about 0.5 $\mu$m to about 5 $\mu$m.

19. The method of claim 16, wherein said polymer treatment fluid comprises said polymer particles dispersed in a hydrocarbon fluid containing from about 0.1% to about 0.5% water based on total volume of said polymer treatment fluid.

20. The method of claim 16, wherein said polymers comprise at least one nonionic vinylamide monomer of the formula:

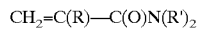

where R represents a hydrogen, methyl, ethyl or propyl moiety and R' represents a hydrogen, methyl, ethyl or propyl moiety.

21. The method of claim 16, wherein said polymers comprise ionic and nonionic monomers, said nonionic monomers comprising at least one of acrylamide, vinyl pyrolidone, n-vinylacetamide, or mixtures thereof.

22. The method of claim 16, wherein said polymers comprise anionic and nonionic monomers, said monomers comprising acrylamide, acrylic acid and further comprising a methylenebisacrylamide crosslinker.

23. The method of claim 16, wherein said polymers comprise cationic and nonionic monomers, said monomers comprising acrylamide, methylene bisacrylamide, and at least one of dimethyldiallylammonium chloride or methacrylamidoethyltrimethylammonium, or a mixture thereof.

24. The method of claim 16, wherein said polymers comprise ionic and nonionic monomers, said ionic monomers comprising at least one of acrylic acid, acrylamidomethylpropanesulfonic acid, maleic acid, itaconic acid, styrene sulfonic acid, vinylphosphonic acid, dimethyldiallylammonium chloride, quaternary ammonium salt derivatives of acrylamide, quaternary ammonium salt derivatives of acrylic acid, or mixtures thereof.

25. The method of claim 16, wherein said polymers comprise cationic and nonionic monomers, said cationic monomer comprising at least one monomer containing ammonium or quaternary ammonium moieties.

26. The method of claim 16, wherein said polymers comprise anionic and nonionic monomers, said anionic monomers comprising at least one monomer having the formula:

$$CH_2=CHC(O)X,$$

where X represents a moiety containing a carboxylic acid or salt of that acid or a moiety containing a sulfuric acid or salt of that acid.

27. The method of claim 16, wherein said polymers comprise cationic, anionic, and nonionic monomers, and wherein:

said nonionic monomer comprises at least one monomer of the formula:

$$CH_2=C(R)-C(O)N(R')_2,$$

where R represents hydrogen, methyl, ethyl, or propyl moiety and R' represents hydrogen, methyl, ethyl or propyl moiety;

said cationic monomer comprises at least one monomer containing ammonium or quaternary ammonium moieties; and said anionic monomer comprises at least one monomer having the formula:

$$CH_2=CHC(O)X,$$

where X represents a moiety containing a carboxylic acid or salt of that acid or a moiety containing a sulfuric acid or salt of that acid.

28. The method of claim 20, wherein said polymers further comprise:

at least one monomer containing ammonium or quaternary ammonium moieties; and a crosslinking monomer.

29. The method of claim 28, wherein said polymers further comprise a monomer having the formula:

$$CH_2=CHC(O)X,$$

where X represents a moiety containing a carboxylic acid or salt of that acid or a moiety containing a sulfuric acid or salt of that acid.

30. The method of claim 28, wherein said dispersion of water swellable crosslinked polymer particles comprises from about 0 parts to about 5 parts of said vinylamide monomer.

31. The method of claim 28, wherein said dispersion of water swellable crosslinked polymer particles comprises from about 0.5 parts to about 5 parts of said monomer containing ammonium or quarternary ammonium moieties.

32. The method of claim 28, wherein said dispersion of water swellable crosslinked polymer particles comprises from about 50 ppm to about 1000 ppm of said crosslinking monomer based on total monomer present in said dispersion.

33. The method of claim 29, wherein said water swellable crosslinked polymer particles comprise about 0 parts to about 5 parts of said monomer having the formula:

$$CH_2=CHC(O)X,$$

where X represents a moiety containing a carboxylic acid or salt of that acid or a moiety containing a sulfuric acid or salt of that acid.

34. A method for hydraulically fracturing a hydrocarbon-bearing subterranean formation and for controlling production of aqueous fluids from a well penetrating said hydrocarbon-bearing subterranean formation following said hydraulic fracturing treatment, comprising:

introducing a polymer treatment fluid through said well into at least a portion of said hydrocarbon-bearing formation, said polymer treatment fluid comprising a first additive that includes a dispersion of water swellable particles, said particles comprising synthetic hydrophillic polymers that are crosslinked so that said polymers are insoluble in water, said particles comprising between about 30% and about 99.9% nonionic hydrophillic monomer by total weight of monomers;

wherein said polymer treatment fluid is introduced into said formation as at least one of a proppant-laden viscosified polymer treatment fluid comprising a mixture of a fracture proppant material, a second additive comprising viscosifying agent, and said polymer treatment fluid; or as a treatment fluid comprising said polymer treatment fluid introduced into said hydrocarbon-bearing formation as a pad stage before or as a flush stage after a viscosified proppant-laden treatment fluid comprising a fracture proppant material;

wherein said first additive differs from said second additive;

wherein a fracture is induced in said hydrocarbon-bearing formation during said treatment;

wherein said hydrocarbon-bearing formation has water-bearing areas or is positioned nearby a water-bearing formation; and wherein said polymer particles interact with said water-bearing areas of said hydrocarbon-bearing formation or with said nearby water-bearing formation so as to limit production of aqueous fluids from said well following said treatment.

35. The method of claim 34, wherein said polymers are formed by polymerizing monomers in an oil external emulsion.

36. The method of claim 34, wherein said polymer particles are present in said treatment fluid in a concentration of between about 0.1% and about 10% by volume of the treating fluid.

37. The method of claim 34, wherein said polymer particles interact with said water-bearing areas of said hydrocarbon-bearing formation or with said adjacent water bearing formation so as to limit growth of said fracture into said water-bearing areas of said hydrocarbon-bearing formation or said adjacent water-bearing formation.

38. The method of claim 34, wherein said polymer particles interact with said water-bearing areas of said hydrocarbon-bearing formation or with said adjacent water bearing formation so as to restrict the flow of fluids from said water-bearing areas of said hydrocarbon-bearing formation or said adjacent water-bearing formation following said treatment.

39. The method of claim 1, wherein said polymer treatment fluid comprises a hydrocarbon base.

40. The method of claim 1, wherein said polymer treatment fluid comprises an aqueous base.

41. The method of claim 15, wherein said carrier fluid comprises aqueous-based fluid.

42. The method of claim 16, wherein said polymer particles are present in said polymer treatment fluid in a concentration of between about 0.1% and about 1.5% by volume.

43. The method of claim 15, wherein said viscosifying agent additive comprises alkylphosphate ester; and wherein said carrier fluid further comprises an aluminum or iron-based activator.

44. The method of claim 42, wherein said viscosifying agent additive comprises alkylphosphate ester; and wherein said carrier fluid further comprises an aluminum or iron-based activator.

45. The method of claim 22, wherein said viscosifying agent additive comprises alkylphosphate ester; and wherein said carrier fluid further comprises an aluminum or iron-based activator.

46. The method of claim 34, wherein said polymer treatment fluid comprises a hydrocarbon base.

47. The method of claim 34, wherein said polymer treatment fluid comprises an aqueous base.

48. The method of claim 1, wherein a fluid loss to said formation of said viscosified polymer treatment fluid comprising said dispersion of water swellable particles is less than a fluid loss of the same viscosified polymer treatment fluid without said water swellable particles.

49. The method of claim 16, wherein a fluid loss to said formation of said viscosified polymer treatment fluid comprising said dispersion of water swellable particles is less than a fluid loss of the same viscosified polymer treatment fluid without said water swellable particles.

50. The method of claim 1, wherein said particles further comprise between about 0% and about 70% ionic hydrophillic monomer by total weight of monomers, and between about 0% and about 1.0% divinyl crosslinking monomer by total weight of monomers.

51. The method of claim 15, wherein said particles further comprise between about 0% and about 70% ionic hydrophillic monomer by total weight of monomers, and between about 0% and about 1.0% divinyl crosslinking monomer by total weight of monomers.

52. The method of claim 34, wherein said particles further comprise between about 0% and about 70% ionic hydrophillic monomer by total weight of monomers, and between about 0% and about 1.0% divinyl crosslinking monomer by total weight of monomers.

53. The method of claim 15, wherein said polymers comprise acrylamide, acrylic acid, and dimethyldiallylammonium chloride monomers; and wherein said polymers further comprise a methylenebisacrylamide crosslinker.

54. The method of claim 53, wherein said polymer treatment fluid comprises a hydrocarbon base.

55. The method of claim 54, wherein said viscosifying agent additive comprises alkylphosphate ester; and wherein said carrier fluid further comprises an aluminum or iron-based activator.

56. The method of claim 34, wherein said polymers comprise acrylamide, acrylic acid, and dimethyldiallylammonium chloride monomers; and wherein said polymers further comprise a methylenebisacrylamide crosslinker.

57. The method of claim 56, wherein said polymer treatment fluid comprises a hydrocarbon base.

58. The method of claim 57, wherein said viscosifying agent comprises alkylphosphate ester; and wherein said carrier fluid further comprises an aluminum or iron-based activator.

* * * * *